United States Patent [19]
Washington et al.

[11] Patent Number: 5,920,572
[45] Date of Patent: Jul. 6, 1999

[54] TRANSPORT STREAM DECODER/ DEMULTIPLEXER FOR HIERARCHICALLY ORGANIZED AUDIO-VIDEO STREAMS

[75] Inventors: Emanuel Washington, Union City, Calif.; Mike Perkins, Louisville, Colo.; Brian Johnson, San Francisco, Calif.; Stephen How, San Diego, Calif.; Nolan Daines, Fremont, Calif.; Tom Ayers, San Jose, Calif.; Keith Vertrees, San Deigo, Calif.

[73] Assignee: Divicom Inc., Milpitas, Calif.

[21] Appl. No.: 08/585,109

[22] Filed: Jan. 11, 1996

Related U.S. Application Data

[63] Continuation of application No. 08/497,690, Jun. 30, 1995, abandoned.

[51] Int. Cl.[6] ...................................................... H04J 3/12
[52] U.S. Cl. ........................ 370/535; 370/497; 370/522; 348/423; 348/476
[58] Field of Search .................................. 370/487, 488, 370/535, 497, 389, 392, 394, 498, 522; 348/384, 426, 476, 423, 460; 364/514 A

[56] References Cited

U.S. PATENT DOCUMENTS

| | | | |
|---|---|---|---|
| 4,748,618 | 5/1988 | Brown et al. ............................. | 370/94 |
| 5,231,486 | 7/1993 | Acampora et al. .................... | 358/133 |
| 5,287,178 | 2/1994 | Acampora et al. .................... | 348/384 |
| 5,287,182 | 2/1994 | Haskell et al. ......................... | 348/500 |
| 5,289,276 | 2/1994 | Siracusa et al. ....................... | 348/384 |
| 5,361,097 | 11/1994 | Kolczynski ............................ | 348/390 |
| 5,365,272 | 11/1994 | Siracusa ................................ | 348/426 |
| 5,371,547 | 12/1994 | Siracusa et al. ....................... | 348/426 |
| 5,381,181 | 1/1995 | Deiss .................................... | 348/423 |
| 5,396,492 | 3/1995 | Lien ...................................... | 370/60 |
| 5,400,401 | 3/1995 | Wasilewski et al. .................... | 380/9 |
| 5,410,355 | 4/1995 | Kolczynski ............................ | 348/438 |
| 5,426,464 | 6/1995 | Casavant et al. ...................... | 348/415 |
| 5,430,485 | 7/1995 | Lankford et al. ...................... | 348/423 |
| 5,448,568 | 9/1995 | Delpuch et al. ....................... | 372/94.2 |
| 5,457,780 | 10/1995 | Shaw et al. ............................ | 348/384 |
| 5,459,789 | 10/1995 | Tamer et al. ........................... | 380/20 |
| 5,467,139 | 11/1995 | Lankford ............................... | 348/512 |
| 5,473,609 | 12/1995 | Chaney ................................. | 370/94.1 |

(List continued on next page.)

OTHER PUBLICATIONS

D. LeGall, MPEG: *A Video Compression Standard for Multimedia Applications,* Comm. of the ACM, Apr., 1994, pp. 47–58.

A. Wasilewski, *MPEG–2 Systems Specification: Blueprint for Network Interoperability,* Comm. Tech., Feb., 1994, pp. 1–8.

*Primary Examiner*—Douglas W. Olms
*Assistant Examiner*—Shick Hom
*Attorney, Agent, or Firm*—Proskauer Rose LLP

[57] ABSTRACT

A transport stream decoder/demultiplexer is provided which includes a program clock recovery circuit for recovering a program clock from program clock reference (PCR) values contained in selected transport packets. A processor is provided for extracting elementary stream data from transport packets labeled with packet identification codes (PIDs) that are specified by a host processor. The processor separately stores the elementary stream data of each stream. A host processor interface is also provided for transferring data between an external host processor and the program clock recovery circuit. A memory manager may be provided for storing the data extracted by the processor for each elementary stream in a corresponding queue. The queues may be maintained by the memory manager in an external RAM. A descrambler interface may be provided for transferring scrambled data and data derived from conditional access information between the processor and an external descrambler. In addition, at least one elementary stream interface, such as a video interface or audio interface, may be provided for outputting extracted elementary stream data for a particular elementary stream from a corresponding queue. Furthermore, a high speed interface may be provided for outputting transport packet data prior to data extraction by the processor.

39 Claims, 12 Drawing Sheets

U.S. PATENT DOCUMENTS

| | | | |
|---|---|---|---|
| 5,475,688 | 12/1995 | Bridgewater et al. | 370/94.1 |
| 5,475,754 | 12/1995 | Bridgewater et al. | 380/20 |
| 5,489,947 | 2/1996 | Cooper | 348/589 |
| 5,510,845 | 4/1996 | Yang et al. | 348/476 |
| 5,515,106 | 5/1996 | Chaney et al. | 348/461 |
| 5,521,979 | 5/1996 | Deiss | 380/20 |
| 5,539,920 | 7/1996 | Menand et al. | 455/5.1 |
| 5,548,532 | 8/1996 | Menand et al. | 364/514 C |
| 5,559,999 | 9/1996 | Maturi et al. | 395/550 |
| 5,563,648 | 10/1996 | Menand et al. | 348/13 |
| 5,566,089 | 10/1996 | Hoogenboom | 364/514 A |
| 5,568,403 | 10/1996 | Deiss et al. | 364/514 R |
| 5,574,505 | 11/1996 | Lyons et al. | 348/426 |
| 5,588,025 | 12/1996 | Strolle et al. | 375/316 |
| 5,617,146 | 4/1997 | Duffield et al. | 348/460 |
| 5,619,501 | 4/1997 | Tamer et al. | 370/392 |
| 5,621,463 | 4/1997 | Lyons et al. | 348/387 | ns 5,920,572

TRANSPORT STREAM DECODER/DEMULTIPLEXER FOR HIERARCHICALLY ORGANIZED AUDIO-VIDEO STREAMS

This is a continuation of U.S. Ser. No. 08/497,690 filed Jun. 30, 1995, now abandoned.

FIELD OF THE INVENTION

The present invention relates to hierarchically organized audio-video data streams. In particular, the present invention relates to streams in which video and audio of one or more programs are multiplexed into a transport layer stream. The present invention provides a system for, amongst other things, decoding/demultiplexing selected video and audio streams from the transport layer stream.

BACKGROUND OF THE INVENTION

The present invention relates to transport and storage of compressed video and audio streams. Illustratively, the invention is illustrated herein using the International Standards Organization (ISO) Motion Picture Experts Group (MPEG) 2 standard for producing compressed video, storing the compressed video and transporting the compressed video to a decoder. See ISO/IEC IS 13818-2: Information Technology-Generic Coding of Moving Pictures and Associated Audio Information: Video; ISO/IEC DIS 13818-1: Information Technology-Generic Coding of Moving Pictures and Associated Audio Information: Systems. For compressed audio there are numerous standards including ISO\IEC IS 11172-2: 1993 Information Technology-Coding of Moving Pictures and Associated Audio for Digital Storage Media at up to about 1.5 Mbit/sec-Part 3 Audio (MPEG-1 Audio); Dolby AC-3; ISO\IEC DIS 13818-3: 1994 Information Technology-Coding of Moving Pictures and Associated Audio Information: Audio (MPEG-2 Audio). The contents of the ISO documents are incorporated herein by reference.

Illustratively, MPEG-1 and MPEG-2 provide for hierarchically organized streams. That is, for a given program, audio and video streams are separately encoded to produced compressed audio and video streams. These compressed audio and video streams are illustratively placed in a higher layer stream such as an MPEG-2 compliant program or transport stream. Closed caption text or other private data of the program may also be placed in the higher layer stream. Each program may include multiple video streams (e.g., multiple camera views) and multiple audio streams (e.g., different language audio). The higher layer transport or program stream provides a manner for associating all related encoded video, audio and private data streams so that they can be extracted, decoded and presented together in a coherent fashion. Furthermore, the higher layer stream may include compressed audio, video and private data for only a single program or for multiple programs. The higher layer stream (i.e., program or transport stream) may be stored in a storage device such as a digital video disc (DVD), video tape, magnetic disk drive, etc. Alternatively, the higher layer stream (i.e., transport stream) is transmitted via a transmission channel. Before transmitting or storing the higher layer transport or program stream, the program or transport stream may be encapsulated in an even higher layer storage format or channel layer stream.

The invention is illustrated herein for transport streams which are transmitted via a transmission channel. However, the scope of the discussion should be sufficiently general for application to program streams and to recording and reproduction of program or transport streams using a storage device.

FIG. 1 depicts an illustrative communications network which illustrates the hierarchical aspect of encoding and decoding. An audio-video signal, such as an analog NTSC, PAL or HDTV signal is divided into audio and video component signals. The audio signal is digitized and encoded by an audio encoder 54. The video signal is converted to SIF format (i.e., luminance signal Y and chrominance signals $C_r$ and $C_b$), digitized and inputted to a video encoder 52. The compressed audio and video outputted from the audio and video encoders 54 and 52 are inputted to a transport stream encoder/multiplexer 56. A private data signal (such as closed captioned text) may also be inputted to the transport stream encoder/multiplexer 56. Such compressed video, compressed audio and private data signals are referred to as elementary streams. The transport stream encoder/multiplexer 56 illustratively also receives elementary streams for a number of other programs. The transport stream encoder/multiplexer 56 multiplexes the elementary streams of one or more programs into one or more transport streams. The transport streams outputted by the transport stream encoder/multiplexer 56 are inputted to a channel encoder 58. The channel encoder 58 encapsulates the one or more transport streams into one or more channel layer streams. The channel layer streams outputted by the channel encoder 58 are then transmitted via a transmission channel 60. The transmission channel 60 may be a telephone network, a cable television network, a computer data network, a terrestrial broadcast system, or some combination thereof. As such, the transmission channel may include RF transmitters, satellite transponders, optical fibers, coaxial cables, unshielded twisted pairs of wires, switches, in-line amplifiers, etc.

The transmitted channel streams are received at a channel decoder 68. The channel decoder 68 recovers the one or more transport streams from the received channel streams. The recovered transport streams are then inputted to a transport stream decoder/demultiplexer 66. The transport stream decoder/demultiplexer 66 extracts particular elementary streams from the inputted transport streams corresponding to one or more user selected programs. An extracted video signal elementary stream is inputted to a video decoder 62 and an extracted audio signal elementary stream is inputted to an audio decoder 64. The video decoder 62 decodes the video signal elementary stream and outputs a decompressed video signal. The audio decoder 64 decodes the audio signal elementary stream and outputs a decompressed audio signal. Illustratively, the decompressed video signal, the decompressed audio signal and private data signal may be combined to produce an NTSC, PAL or HDTV signal.

To better understand the considerations associated with decoding hierarchical encoded streams of audio and video, the elementary and transport stream layers are now discussed in greater detail. While channel streams are not specifically discussed, a variety of standard channel streams have been proposed for transmission via different kinds of channels. See J. PROAKIS, DIGITAL COMMUNICATIONS, 2nd ed. (1989) for a discussion of forward error correction of errors which may arise in the channel.

A. Elementary Streams

For sake of brevity, the discussion below focuses largely on video elementary streams. MPEG-2 provides for compressing video by reducing both spatial and temporal redundancy. A good tutorial for MPEG-2 video compression is contained in D. Le Gall, *MPEG: A Video Compression*

Standard for Multimedia Applications, COMMUNICATIONS OF THE ACM, April 1991. The contents of this document are incorporated herein by reference. A spatial encoder 80 is shown in FIG. 2 including a discrete cosine transform circuit (DCT) 83, a quantizer (Q) 85 a variable length encoder circuit (VLC) 87 and a video buffer verifier (VBV) 89. To spatially encode a picture, the picture is divided into blocks of pixels, e.g., 8×8 blocks of pixels. Each block of pixels is discrete cosine transformed to produce a number of transform coefficients. The coefficients are read out of the DCT 83 in a zig-zag fashion in relative increasing spatial frequency, from the DC coefficient to the highest vertical and horizontal spatial frequency AC coefficient. This tends to produce a sequence of coefficients containing long runs of near zero magnitude coefficients. The coefficients are quantized in the quantizer 85 which, amongst other things, converts the near-zero coefficients to zero. This produces coefficients with non-zero amplitude levels and runs (or subsequences) of zero amplitude level coefficients. The coefficients are then (zero) run-level encoded and variable length encoded in the variable length encoder 87. The variable length encoded coefficients are inputted to a buffer 70. To prevent underflow or overflow of the buffer 70, the quantizer step size of the quantizer 85 is adjusted by the video buffer verifier 89.

Blocks which are solely spatially encoded such as described above are referred to as intrablocks because they are encoded based only on information self-contained in the block. An intra-picture or I picture is a picture which contains only intrablocks. (Herein, "picture" means field or frame as per MPEG-2 nomenclature).

In addition to a spatial encoder, a temporal encoder 90 is provided to reduce temporal redundancy. In temporal coding, it is presumed that there is a high correlation between groups of pixels in one picture and groups of pixels in another picture of a sequence of pictures. Thus, a group of pixels can be thought of as moving from one relative position in one picture, called an anchor picture, to another relative position of another picture, with only small changes in the luminosity and chrominance of its pixels. In MPEG-2, the group of pixels is a block of pixels, although such blocks need not be the same size as those on which spatial coding is performed. (For instance, temporal coding may be performed on "macroblocks" equal in size to four of the blocks which are used for spatial coding. Thus, if spatial coding is performed on 8×8 pixel blocks, temporal encoding is performed on 16×16 pixel macroblocks.) The temporal coding proceeds as follows. A block of pixels, in a picture to be encoded, is compared to different possible blocks of pixels, in a search window of a potential anchor frame, to determine the best matching block of pixels in the potential anchor frame. This is illustrated in FIG. 3. A motion vector MV is determined which indicates the relative shift of the best matching block in the anchor frame to the block of the picture to be encoded. Furthermore, a difference between the best matching block and the block in the picture to be encoded is formed. The difference is then spatially encoded.

Blocks which are temporally encoded are referred to as interblocks. Interblocks are not permitted in I pictures but are permitted in predictive pictures or P pictures or bidirectionally predictive pictures or B pictures. P pictures are pictures which each only have a single anchor picture, which single anchor picture is presented in time before the P picture encoded therewith. Each B picture has an anchor picture that is presented in time before the B picture and an anchor picture which is presented in time after the B picture. This dependence is illustrated in (FIG. 3 and) FIG. 4 by arrows. Note that pictures may be placed in the elementary stream in a different order than they are presented. For instance, it is advantageous to place both anchor pictures for the B pictures in the stream before the B pictures which depend thereon (so that they are available to decode the B pictures) even though half of those anchor pictures will be presented after the B pictures. While P and B pictures can have interblocks, some blocks of P and B pictures may be encoded as intrablocks if an adequate matching block cannot be found therefor.

In the temporal encoder 90, it is first necessary to have the blocks of the anchor pictures available for use in encoding. Thus, blocks which have been discrete cosine transformed and quantized are dequantized in inverse quantizer 91 and inverse discrete cosine transformed in inverse discrete cosine transform circuit 92. The reproduced blocks of pixels of the anchor pictures are stored in picture memory 94. If necessary to reconstruct the reproduced block of an anchor picture (i.e. a P picture), a previous block of pixels from a previous picture is added to the decoded block of pixels outputted by the IDCT 92 using adder 93.

Picture memory 94 outputs one or more search windows of pixels of the anchor pictures stored therein to motion estimator 95 which also receives an inputted macroblock of a picture to be temporally encoded. The motion estimator determines the best matching macroblock(s) in the search window(s) to the inputted macroblock and the motion vector (s) for translating the inputted macroblock to the best matching macroblock(s). The best matching macroblock(s) is subtracted from the inputted macroblock in subtractor 96 and the difference is spatially encoded by the spatial encoder 80. The motion vector is (variable length encoded and) multiplexed with the spatially encoded difference macroblock.

Note, the amount of compressed information in the above encoding processes varies from picture to picture. I pictures tend to require significantly more bits than P and B pictures. Furthermore, it is possible for an encoder to arbitrarily encode inputted video pictures as I, P or B pictures. However, many implementations at least specify that I pictures should be produced every predetermined number of pictures. In particular, MPEG-2 defines a video stream syntax wherein a group of pictures (GOP) start code is provided followed by a predetermined number and sequence of I, P and B pictures. Such GOP's have an I picture as the very first picture.

Second, while the encoded video elementary stream has a nominal average bit rate, the instantaneous bit rate can fluctuate. On the other hand, the audio bitstream has a relatively constant bit rate. As discussed below, the transport stream provides a mechanism for ensuring that both audio and video are timely presented so as to synchronize the video and audio of a particular program.

Also note that only I pictures can be independently decompressed. In order to decode P and B pictures, the anchor frames, on which they depend, must also be decompressed. It is important to ensure that the anchor pictures are decompressed in a timely fashion. If anchor pictures are decompressed too late, then it may be impossible to use them to decode the interceded pictures on which they depend. If they are decompressed too early, then a very large amount of memory space may be needed to store the decoded information until such time as it is needed. As discussed below, the transport stream provides a mechanism for ensuring that anchor pictures are timely decoded.

B. Transport Streams

MPEG-2 provides two higher layer streams called the program stream and the transport stream. However, it is believed that most storage and transmission uses of MPEG-2 compressed video and audio will utilize the transport stream. Therefore, this invention is explained in the context of the transport stream. A good tutorial of MPEG-2 transport streams is contained in A. Wasilewski, *MPEG-2 Systems Specification: Blueprint for Network Interoperability*, COMM. TECH., February, 1994. The contents of this document are incorporated herein by reference.

According to the MPEG-2 standard, the data of each digital elementary stream is first placed into program elementary stream (PES) packets of arbitrary length. The PES packet data, and other data, relating to one or more programs may be combined into one or more transport streams. The transport stream is organized into fixed length (more precisely, 188 byte length) packets. Each of the transport stream packets includes a four byte header and a 184 byte payload.

Each transport packet can carry PES packet data, e.g., private data or video or audio data (e.g., which may be compressed and formed into streams according to MPEG-2 syntax), or program specific information (PSI) data (described below). Private data may be placed in optional adaption fields in the transport packet. Transport packets may not contain both PES packet data and PSI data. Furthermore, transport packets may only contain PES packet data for a single elementary stream.

Each transport packet is assigned a packet identification code or PID. The purpose of the PID is to label the transport packet. All packets with a particular PID have related contents, e.g., all have particular PSI data, all have PES packet data for a particular elementary stream, etc.

In addition, PES bearing packets may also contain program clock reference (PCR) values, presentation time stamps (PTS) and decoding time stamps (DTS). The PCR is a snapshot of the encoder clock at the encoders which produced the elementary streams of a particular program. Since elementary streams for multiple programs produced at different times may be multiplexed into the same transport stream, it is not unusual to have divergent PCR values for the elementary streams associated with different programs. PTS's indicate the time when a video picture or audio frame should be presented (i.e., displayed on a monitor or converted to sound on a loudspeaker) relative to the encoder clock (PCR's) of the encoders which produced the video and audio. On the other hand, DTS's indicate the time when a video picture should be decoded relative to the encoder clock. PTS's enable the synchronization of video and audio of a particular program despite the lack of instantaneous correlation between the video and audio bit rates. DTS's enable the timely submission of compressed anchor video pictures to the encoder for use in decoding interceded pictures which depend thereon.

PSI data includes information other than elementary stream data which is necessary to decode the PES packet data such as, information for identifying which of plural transport streams contains the information for a specific program, information for locating elementary streams associated with specific programs, and conditional access information. In networks wherein multiple transport streams are received, a Network Information Table (NIT) may be transmitted in each transport stream. The NIT is identical in each transport stream and indicates, amongst other things, which programs are carried in each transport stream. (Where program streams are modulated onto different "frequency channels" or carriers, the NIT also indicates on which carrier each transport stream is modulated.) Thus, to identify the transport stream containing a program of interest, one need only access the NIT on any one of the transport streams.

As noted, above, each transport packet can only carry PES packet data for one elementary stream, e.g., one audio elementary stream or one video elementary stream. In order to correlate elementary streams of a single program, program association table (PAT) and program mapping table (PMT) PSI is provided. Illustratively, the PID 0×00 is reserved for labeling each transport packet that contains entries of the PAT. The PAT contains, amongst other things, the PID of the transport packets containing the NIT. The PAT also contains information indicating the PID of each transport packet which contains the PMT entries for each program (where each program is identified by a unique program number). For instance, the PAT may indicate that the PMT entries for programs numbered 1–25 are contained in transport packets with the PID=0×1C, the PMT entries for programs numbered 26–50 are contained in transport packets with the PID=0×1D, etc. The PMT, in turn, actually correlates all of the related elementary streams of each program for which the PMT contains an entry. To that end, each PMT entry includes the program number of the program to which it corresponds and a variable number of PIDs including one PID for each transport packet containing PES packet data of an elementary stream related to that program. (Illustratively, each PMT entry includes other information such as, the PID of the packets containing the PCR's for this program, the type of each stream, i.e., audio, video, etc.)

Conditional access information relates to, amongst other things, descrambling elementary streams which have been scrambled prior to placement in the transport stream. Only PES packet data may be scrambled. However, either a PES packet payload or both the PES packet header and payload may be scrambled. Transport packet headers and PSI data may not be scrambled. MPEG-2 requires that whenever transport packet payload data is scrambled, conditional access information for descrambling the packets must be provided.

Two types of conditional access information may be provided. The first type of conditional access information is referred to entitlement management messages (EMM). EMMs are "system-wide" messages relating to more than one elementary stream. EMMs are compiled into a conditional access table (CAT) which is transmitted in transport packets with PID=0×01. A second type of conditional access information is referred to as entitlement control messages (ECM). ECMs are elementary stream specific. ECMs are placed in the PMT entries corresponding to the program number with which they are associated.

Each transport packet header includes a synchronization value for use in identifying the boundaries (i.e., beginning) of each transport packet. Illustratively, MPEG-2 specifies that each transport packet begin with the sync byte 01000111.

MPEG-2 provides a syntax for constructing elementary streams and transport streams. MPEG-2 also specifies basic parameters and functions for decoding such elementary streams and transport streams. However, no specific architecture is specified for constructing a transport decoder/demultiplexer.

It is therefore an object of the present invention to provide a transport stream decoder/demultiplexer. It is a further object to provide a transport stream decoder/demultiplexer which is simple to construct and operate yet provides great flexibility in use. It is a further object to provide a flexible transport stream decoder/demultiplexer which can be embodied on an integrated circuit chip.

SUMMARY OF THE INVENTION

These and other objects are achieved by the present invention. According to one embodiment, a transport stream decoder/demultiplexer is provided with a program clock recovery circuit, a processor and a host processor interface. The processor receives transport packets that are contained in a transport stream which is inputted to the transport stream decoder/demultiplexer. The processor extracts elementary stream data from specific transport packets that have pre-specified packet identification codes (PIDs) and separately stores the extracted data of each elementary stream. For example, a host processor connected to the host interface determines which program and elementary streams (the video elementary streams, audio elementary streams, private data streams, etc.) therefore should be selected. The processor of the transport stream decoder/demultiplexer then selects the transport packets containing the selected elementary streams of the program for extraction of elementary stream data therein. Illustratively, a packet framer may be provided which identifies the boundaries of the transport packets in the transport stream and transfers the packets to the processor via a FIFO.

The host processor interface is for transferring data between an externally connected host processor and the program clock recovery circuit. Illustratively, a host processor connected to the host interface can, amongst other things, assist the program clock recover circuit in maintaining the program clock. The program clock recovery circuit recovers program clock reference (PCR) values from particular transport packets and passes the recovered PCR value and current program clock count to the host processor via the host interface. The host processor, in turn, filters the recovered program clock reference and current program clock count and outputs the filtered result via a feedback loop to adjust the program clock maintained by the program clock recovery circuit.

The transport stream decoder also illustratively includes a memory manager circuit connected to the processor. The memory manager, amongst other things, receives the data of each elementary stream from the processor and separately stores the data of each elementary stream. Illustratively, the memory manager stores the data of each elementary stream in a queue corresponding to the elementary stream. Illustratively, the queues are maintained by the memory manager in an external RAM. The memory manager also enables the host processor connected via the host interface to directly access the data stored in the external RAM. For instance, the host processor can use the external RAM to store its program instructions and data. The memory manager, in turn, arbitrates amongst each device which desires to access the external RAM, such as the processor of the transport stream decoder/demultiplexer and the host processor, to ensure fair and orderly access to the external RAM.

At least one elementary stream interface may be provided for outputting encoded elementary stream data to an external elementary stream decoder. Each elementary stream interface illustratively can retrieve the data of one specific elementary stream (from the appropriate queue maintained by the memory manager). Examples of elementary stream interfaces are a video interface, for outputting video elementary stream data to an external video decoder, and an audio interface, for outputting audio elementary stream data to an external audio decoder. Illustratively, one queue is dedicated for storing video elementary stream data extracted by the processor. This queue is accessed by the video interface via the memory manager. Likewise, one queue may be dedicated for storing audio elementary stream data extracted by the processor. The audio queue is accessed by the audio interface via the memory manager.

A descrambler interface is also illustratively provided for outputting selected transport packet data and information derived from conditional access information contained in the transport packets to an external descrambler circuit. The descrambler interface also receives descrambled information from the external descrambler circuit. Illustratively, the inputted conditional access information and transport packet data is identified and extracted by the processor of the transport stream decoder/demultiplexer. The host processor connected via the host interface derives information from the extracted conditional access information. The processor of the transport stream decoder/demultiplexer transfers the transport packet data of selected transport packets and derived information to the descrambler interface. Descrambled data returned via the descrambler interface is illustratively provided to the processor.

Illustratively, a high speed interface is provided for receiving transport packets at a high speed. To that end, the transport packets are not examined for purposes of extracting PSI or elementary stream data by the processor. Rather, the processor merely identifies those packets which are to be transferred to the high speed interface and transfers them thereto at high speed.

In short, a transport stream decoder architecture is provided which is flexible and simple to embody in IC chip form.

DETAILED DESCRIPTION OF THE INVENTION

Figure 1:
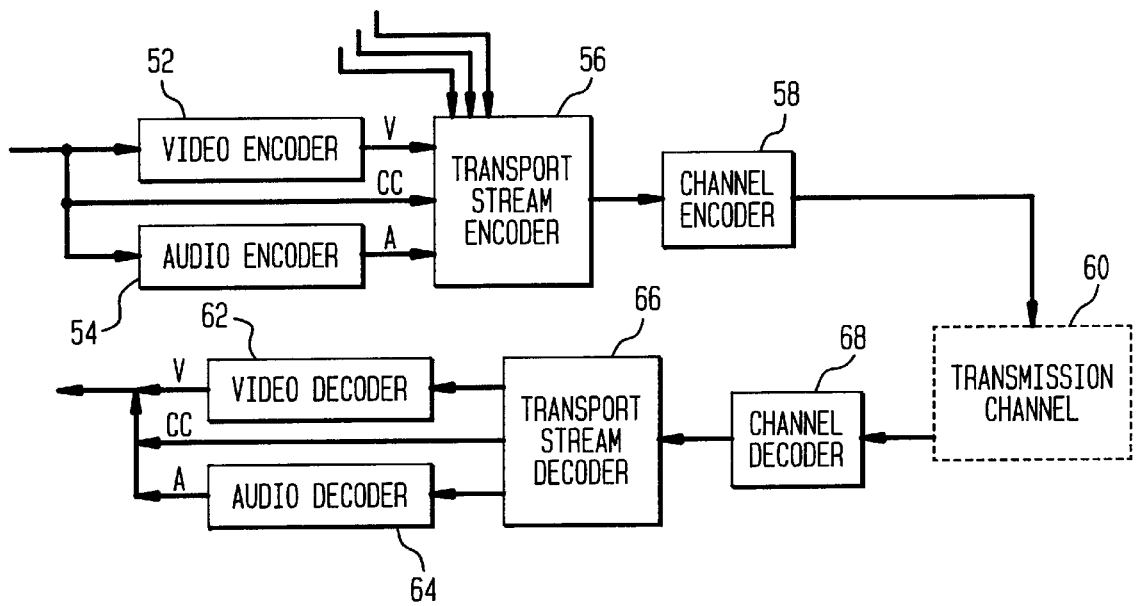
FIG. 1 depicts a conventional communications network.
Figure 2:
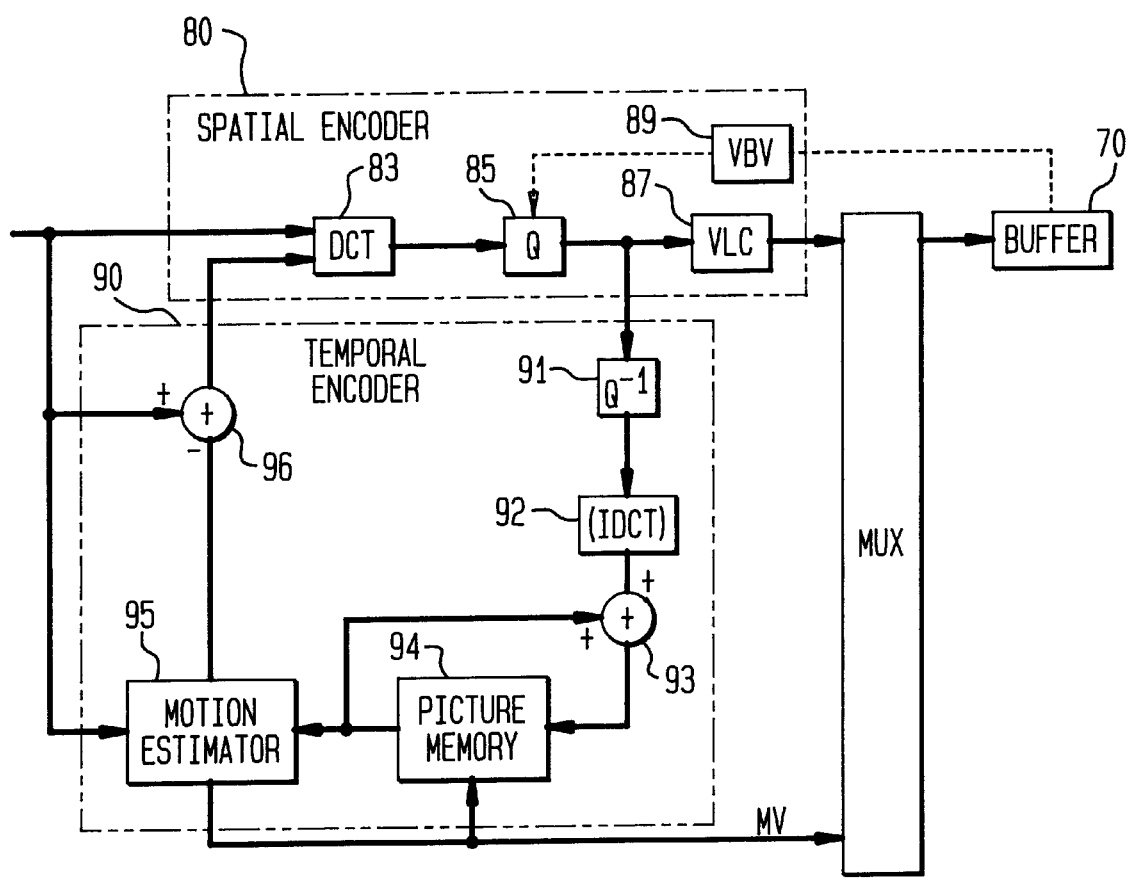
FIG. 2 depicts a conventional video encoder.
Figure 3:
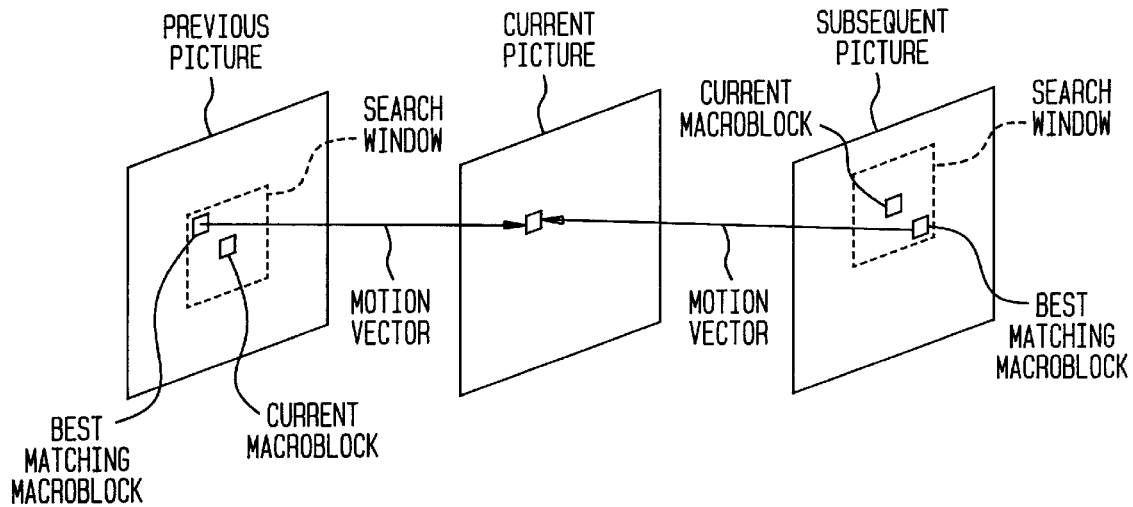
FIG. 3 illustrates motion estimation in the temporal encoder of the conventional video encoder of FIG. 2.
Figure 4:
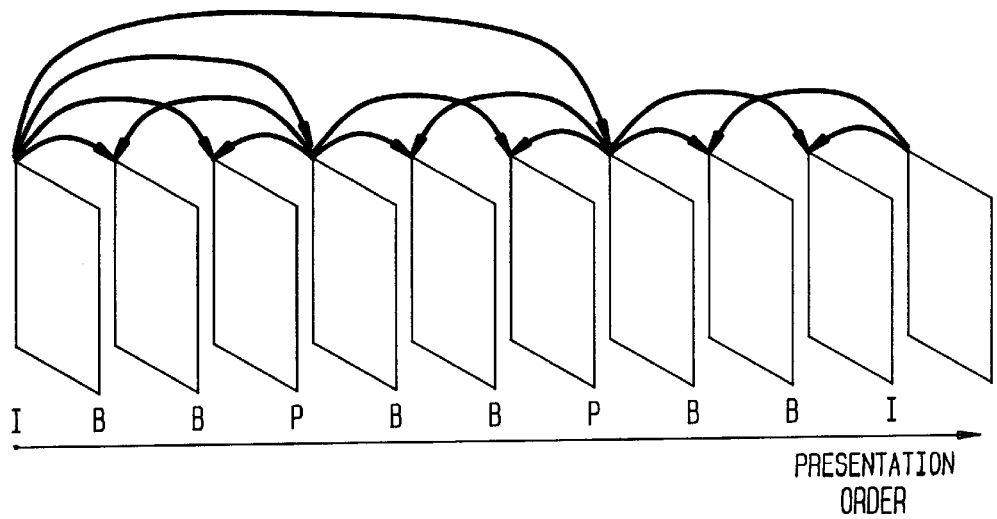
FIG. 4 illustrates the dependence of interceded pictures on anchor pictures.
Figure 5:
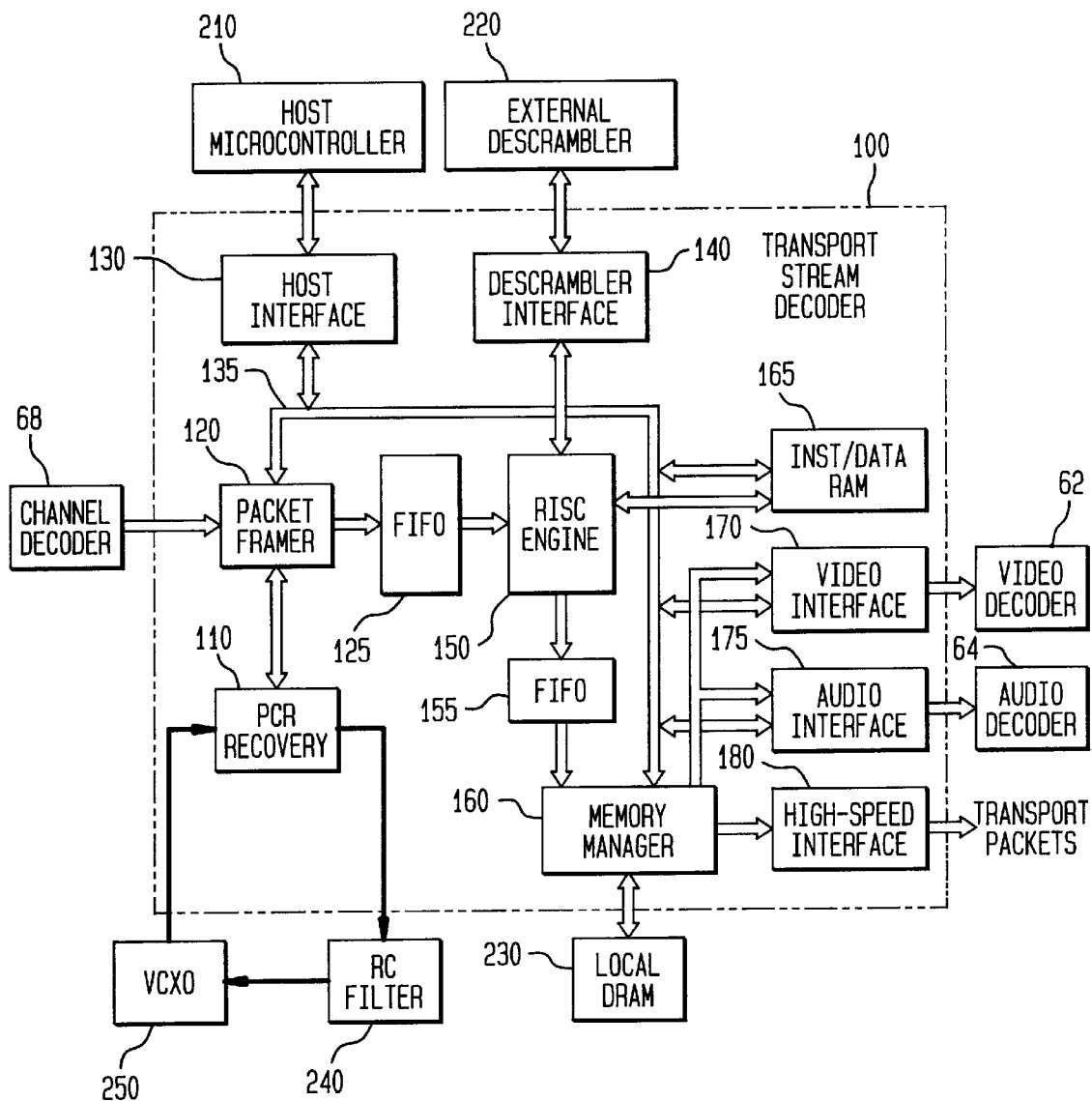
FIG. 5 illustrates a decoder according to an embodiment of the present invention.

FIG. 5 depicts a transport stream decoder/demultiplexer 100 according to the present invention. Illustratively, the devices 110–180 may be formed in a single integrated circuit chip. The overall architecture is first discussed followed by a more detailed description of certain functions performed by the transport stream decoder/demultiplexer 100.

As shown, a channel decoder 68, such as LSI Logic™'s LS64706, outputs a transport stream to a packet framer circuit 120. The packet framer circuit 120 identifies the boundaries of the transport packets contained in the inputted transport stream and outputs transport packets. The manner in which this is achieved is described in greater detail below.

The packet framer 120 is connected to a PCR recovery circuit 110 which recovers PCR values, and maintains a program clock and an internal clock. The PCR recovery circuit 110 has an output connected to an external RC filter 240. The RC filter 240, in turn, is connected to an external voltage controlled crystal oscillator 250. The voltage controlled crystal oscillator 250 is connected to the PCR recovery circuit 110. The purpose of the interconnection of circuits 110, 240 and 250 is explained in greater detail below.

The packet framer 120 outputs transport packets to a FIFO (first-in first-out memory) 125. The FIFO 125 buffers the transport packet data for output to a processor 150 which illustratively is a RISC processor. Illustratively, the RISC processor 150 utilizes a variable amount of time to process transport packet data. The FIFO 125 therefore decouples the constant bit rate, at which the packets are outputted from the packet framer 120, from the variable bit rate, at which the RISC processor 150 processes the packet data.

The RISC processor 150 selects pre-specified transport packets for further processing (non-selected transport packets are discarded). Depending on specify-able transport packet criteria, the RISC processor 150 may (1) output all or part of particular selected packets to a descrambler interface 140, (2) output particular selected packets to a memory manager 160 (via a FIFO 155), or (3) extract elementary stream or PSI data from particular selected transport packets for output to the memory manager 160. Illustratively, the RISC processor 150 accesses instructions and information stored in the internal instruction/data RAM 165 in order to process the transport packets. The manner in which the RISC processor 150 selects transport packets and determines how to process each selected packet is described below.

If the RISC processor 150 extracts PSI data or elementary stream data from a transport packet, the RISC processor 150 may output the extracted elementary stream data to the FIFO 155. The FIFO 155 buffers data outputted by the RISC processor 150 for input to the memory manager 160. The memory manager 160, amongst other things, maintains plural queues in an external RAM 230. The memory manager 160 stores the data each of elementary stream extracted by the RISC processor 150 in a different one of the queues The maintenance of the queues by the memory manager 160 is described in greater detail below.

The memory manager 160, in turn, outputs enqueued video elementary stream or PES packet data to the video interface 170. Likewise, the memory manager 160 outputs enqueued audio elementary stream or PES packet data to the audio interface 175. The memory manager 160 illustratively may also accept certain data directly from the FIFO 155 for output to the high speed interface 180.

The video interface 170 outputs video elementary stream data provided by the memory manager 160 to an external video decoder 62 such as C-Cube™'s 9100 video decoder. Likewise, the audio interface 175 outputs audio elementary stream data to an external audio decoder 64 such as Crystal Semiconductor™'s CS4920, Texas Instrument™'s AV110 or LSI Logic™'s LS6411 audio decoder. The high speed interface 180 is provided for outputting transport packets at a high speed with minimal processing by the RISC processor 150.

As discussed in greater detail below, the descrambler interface 140 receives from the RISC processor 150 data including scrambled transport packet payload (or PES packet payload) data and data derived from conditional access information. The descrambler interface 140 provides this information to an external descrambler circuit 220 connected thereto which may be any descrambler 220 supporting a variety of known encryption standards such as DVB or Data Encryption Standard (DES). The descrambler interface 140 also receives the descrambled data from the external descrambler 220. The transfer of data between the descrambler interface 140 and the external descrambler circuit 210 is discussed in greater detail below. The descrambled data is returned to the RISC processor 150 for further processing or output via the memory manager 160.

A host interface 130 is provided for purposes of connecting a host processor 210 to the transport stream decoder/demultiplexer 100. Specifically, the host interface 135 is designed to seamlessly interface to Motorolla™'s 68xxx family of microcontrollers. However, the host interface 135 can also be interconnected to Intel™'s 80×86 microprocessors with a small amount of glue logic.

The host processor 210 is connected to a bus 135. The bus 135, in turn, is connected to the packet framer 120, PCR recovery circuit 110, internal instruction/data RAM 165, video interface 170, audio interface 175 and the memory manager 160. By means of the host interface 130 and bus 135, the external host processor 210 can load instructions and data into the internal instruction/data RAM 165. The external host processor 210 can also access elementary stream and PSI data which is enqueued into any of the queues maintained by the memory manager 160 in the external RAM 230. Alternatively, the host processor 210 can store its data and executable instructions in, and retrieve its data and executable instructions from the external RAM 230 via the memory manager 160. In addition, the host processor 210 can cooperate with the PCR recovery circuit 110 for purposes of assisting in the maintenance of the program clock therein in response to received PCR values. Furthermore, the host processor 210 can control the bit rate at which data is outputted from the video interface 170 and audio interface 175.

Below, selected features of the transport stream decoder are separately discussed in greater detail.

Transport Packet Framing

Consider that the transport stream is a stream of bits formed from consecutive transport packets which have 188 bytes each. In order to recover the information in the transport packets, the packet framer 120 must determine where each packet begins and ends (i.e., the boundaries of each packet). However, the transport stream outputted from the channel decoder 68 need not begin on a transport packet boundary. Illustratively, the packet framer 120 locks onto the boundaries of the transport packets and maintains the synchronization with the transport packets utilizing a lock/unlock hysteresis process. As noted above, MPEG-2 requires that all transport packets begin with a predetermined sync byte. The packet framer 120 performs a bit-by-bit search to identify a byte that is the same as the predetermined sync byte. However, the packet framer may not in fact have found the sync byte of a transport packet. Instead, the packet framer may have identified an arbitrary sequence of bits within a transport packet which resembles the sync byte. To verify whether or not the sync byte was detected, the packet framer 120 presumes that the sync byte was detected. The packet framer 120 then attempts to identify the sync byte in each of a consecutive sequence of packets, using the detected "sync byte" as a basis for identifying packet boundaries. If the packet framer 120 is able to identify a sync byte in a threshold (sync_lock) number of consecutive transport packets, then the packet framer 120 can presume that it has identified the boundaries of the transport packets with the transport stream and is locked in synchronism thereto. Once synchronization is locked, the packet framer 120 monitors the receipt of sync bytes in transport packets. If the packet framer 120 fails to detect a sync byte in a threshold (sync_unlock) number of consecutive transport packets, then the packet framer 120 presumes that it is no longer synchronized to the transport packet boundaries.

Figure 6:
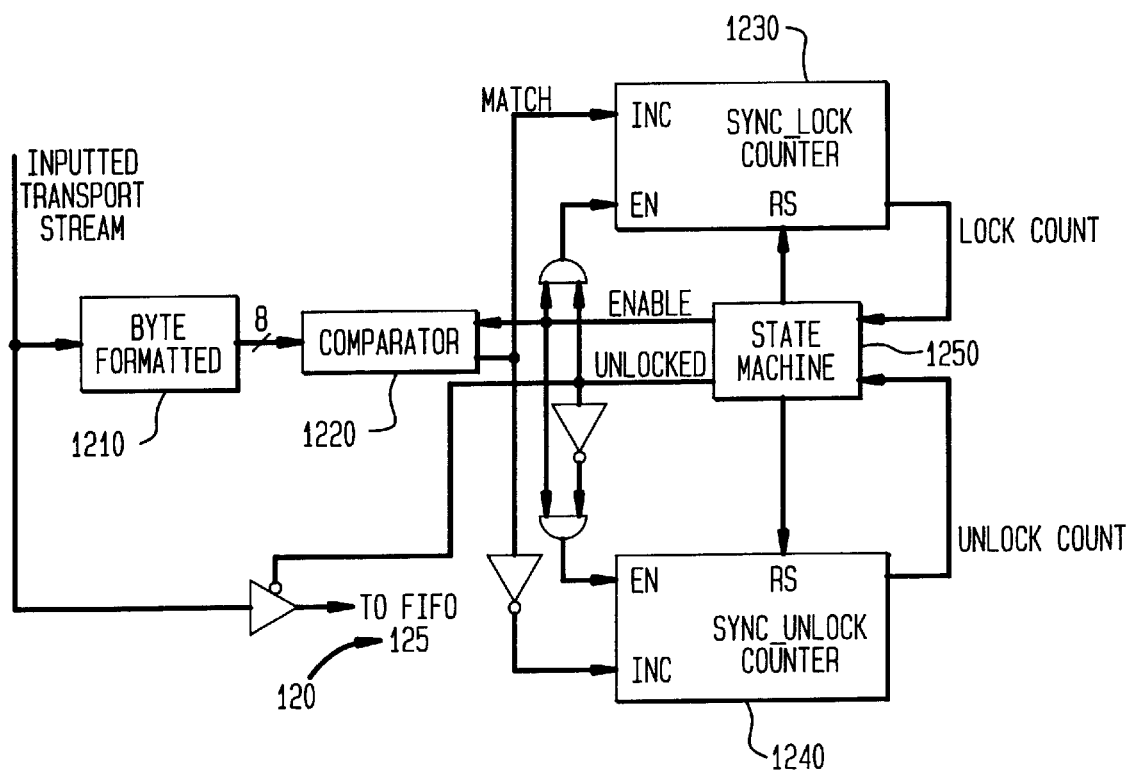
FIG. 6 illustrates an illustrative packet framer in greater detail.

FIG. 6 illustrates the circuitry of the packet framer 120. An inputted bitstream is received at a byte formatter 1210. (The inputted bitstream may be received one bit at a time, one byte at a time, etc.). The byte formatter 1210 outputs bytes to a comparator 1220 which bytes include each received bit appended to the seven bits sequentially received prior thereto. The comparator 1220 receives an enable signal from a state machine 1250. In response to the enable signal, the comparator 1220 compares the byte received from the byte formatter 1210 to the predetermined start code. In response to this comparison, the comparator 1220 outputs a match signal to a sync_lock counter 1230 and the complement of the match signal to a sync_unlock counter 1240. The counts of the sync_lock counter 1230 (lock count) and sync_unlock counter 1240 (unlock count) are inputted to the state machine 1250. In response, the state machine 1250 outputs a signal "unlocked" indicating whether or not synchronization is locked onto, or unlocked from, the boundaries of the transport packets. The unlocked signal is combined with the enable signal and the combined signal thus formed is inputted to the enable input of the sync_lock counter 1230. Likewise, the complement of the unlocked signal is combined with the enable signal and the combined signal thus formed is inputted to the enable input of the sync_unlock counter 1240. The state machine 1250 also outputs a first reset signal to the reset input of the sync_lock counter 1230 and a second reset signal to the reset input of the sync_unlock counter 1240.

Figure 7:
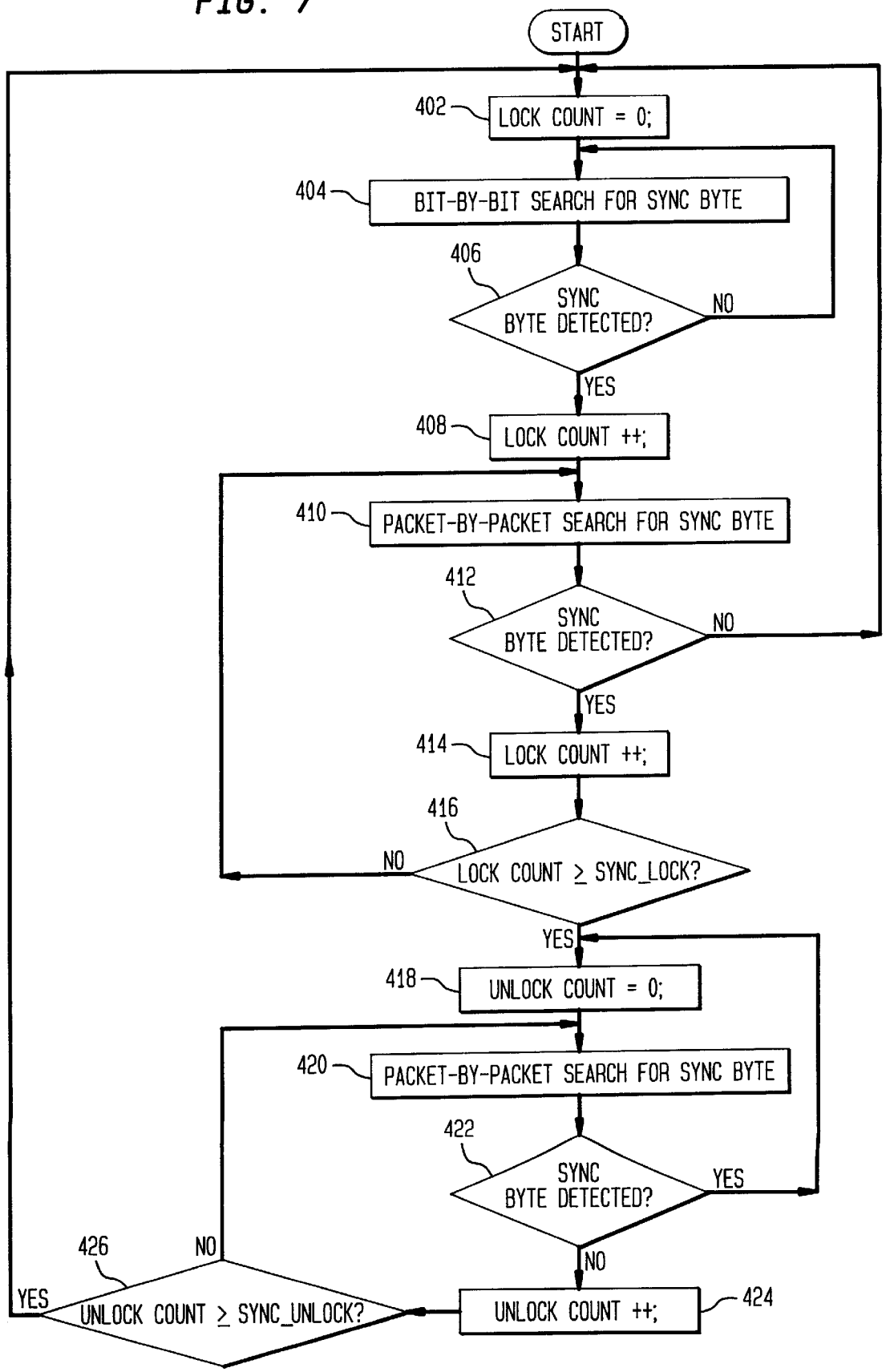
FIG. 7 is a flowchart which schematically illustrates a synchronization lock/unlock hysteresis in the packet framer.

FIG. 7 is a flowchart which schematically illustrates the locking and unlocking hysteresis mechanism employed by the packet framer 120 in maintaining synchronization with the transport packet boundaries of the packets contained in the transport stream. Initially, synchronization in the packet framer 120 is in the unlocked state. The state machine 1250 outputs an unlocked signal which (when combined with the enable signal) enables the sync_lock counter 1230 but (when its complement is combined with the enable signal) disables the sync_unlock counter 1240. Furthermore, the state machine 1250 generates an enable signal each time a bit of the transport stream is received. In step 402, the packet framer 120 sets the lock count of the sync_lock counter 1230 (indicating the number of consecutive transport packets in which a sync byte was detected) equal to zero. To that end, the state machine 1250 outputs the first reset signal to reset the sync_lock counter 1230 to zero. Next in step 404, the packet framer 120 performs a bit-by-bit search on the inputted transport stream to locate the sync byte. Each time a bit is received, the byte formatter 1210 appends the received bit to the previously received sequence of seven bits. In step 406, the comparator 1220 compares the byte thus formed to the predetermined sync byte. In step 406, if the byte thus formed does not match the predetermined sync byte, the comparator 1220 outputs an appropriate match signal so indicating. This match signal does not increment the sync_lock counter 1230. Since lock count of the sync_lock counter 1230 remains unchanged, the state machine 1250 does not change its state. Thus, execution returns to step 404.

If the byte thus formed is the same as the sync byte, the comparator 1220 outputs a match signal that indicates that a match occurred. The match signal increments the sync_lock counter 1230. The non-zero count is detected in the state machine 1250. In step 410, the state machine 1250 responds to the non-zero count of the sync_lock counter 1230 by adjusting the frequency with which the enable signal is generated. In particular, the state machine 1250 does not enable the comparator 1220 until the $188^{th}$ byte, from the matching byte, in the transport stream is received. In other words, the matching byte is presumed to be the sync byte of a transport packet. If such is in fact the case, then another sync byte, of the very next packet will occur precisely 188 bytes later in the transport stream. In step 412, the comparator 1220 is enabled 188 bytes later by the state machine 1250 and determines if the byte outputted by the byte formatter 1210 is the same as the predetermined sync byte. If not, then the comparator 1220 outputs a match signal indicating that no match has occurred, the count of the sync_lock counter 1230 is not incremented, and the state machine 1250, under the presumption that the boundary of the transport packets have no yet been identified, responds by performing the initialization steps. In other words, execution returns to step 402.

On the other hand, if the obtained byte is the same as the sync byte, (the comparator 1220 outputs a match signal indicating a match) the packet framer 120 proceeds to step 414. In step 414, the sync_lock counter 1230 increments the count therein by one. The increased count is inputted to the state machine 1250. In step 416, the state machine 1250 determines if the sync byte has been detected in a first threshold (sync_lock) number of consecutive transport packets by comparing the lock count of the sync_lock counter 1230 to sync_lock. If lock count<sync_lock, then the packet framer 120 returns to step 410.

If a sync byte has been detected in sync_lock number of consecutive transport packets (lock count≧sync_lock), the state machine 1250 presumes that it is synchronized to the packet boundaries of the transport packets and enters the locking state. Thus, the state machine 1250 outputs an unlock signal which disables the sync_lock counter 1230 and which enables the sync_unlock counter 1240. Execution in the packet framer 120 proceeds to step 418. In step 418, the unlock count is initialized to 0. To that end, the state machine 1250 outputs the second reset signal to reset the sync_unlock counter 1240 to zero. Next in step 420, the packet framer 120 performs a packet-by-packet search for the sync byte of each consecutive transport packet (using the presumed identified boundaries in relation to the previously matched sync bytes as a basis for locating the sync byte). This is achieved by the state machine 1250 outputting an enable signal for every $188^{th}$ byte received in the transport stream from the presumed transport packet boundary. Thus, the comparator 1220 is enabled to compare selected bytes, presumed to be the sync bytes of the transport packets, to the redetermined sync byte. In step 422, the comparator 1220 compares the byte in the presumed sync byte position of the current transport packet to the predetermined sync byte. If they match, the comparator 1220 outputs an appropriate match signal. This does not change the count of the sync_unlock counter 1240, and the state machine 1250 maintains its state. Thus, execution returns to step 418. If the obtained byte does not match the predetermined sync byte then the comparator 1220 outputs a match signal indicating this event. This causes the sync_unlock counter 1240 to increment the unlock count in step 424. The increased unlock count is detected by the state machine 1250 which changes state. As such, execution proceeds to step 426. In step 426, the state machine 1250 determines whether or not the number of consecutive transport packets for which a sync byte is not found (the unlock count of the sync_unlock counter 1240) is at least a second threshold (sync_unlock). If not, execution returns to step 420. If unlock count≧sync_unlock, then the state machine 1250 presumes that synchronization is no longer locked onto the transport packet boundaries. In such a case, the state machine changes state appropriately so as to return to step 402.

While in the unlocked state (steps 402–416), the packet framer 120 refrains from outputting any transport stream data. This is because the packet framer 120 has not verified with a sufficient level of accuracy the transport packet boundaries. As soon as the packet framer 120 enters the locked state (steps 418–426) the packet framer 120 outputs transport packets to the FIFO 125.

Internal Clocks

Illustratively, the transport stream decoder maintains plural clocks including a program clock and an internal clock. The program clock is a 27 MHz clock that is synchronized to the encoder clock which encoded the elementary stream data of a preselected program (the selection of a specific program is discussed in greater detail below). As per the MPEG-2 standard, the program clock can be derived from PCR values associated with each program. The internal clock, on the other hand is a 40.5 MHz clock. The internal clock is used to synchronize the internal circuits 110–180 of the transport stream decoder/demultiplexer 100. Illustratively, the 40.5 MHz clock is generated in the transport stream decoder 100 from the 27 MHz program clock.

Figure 8:
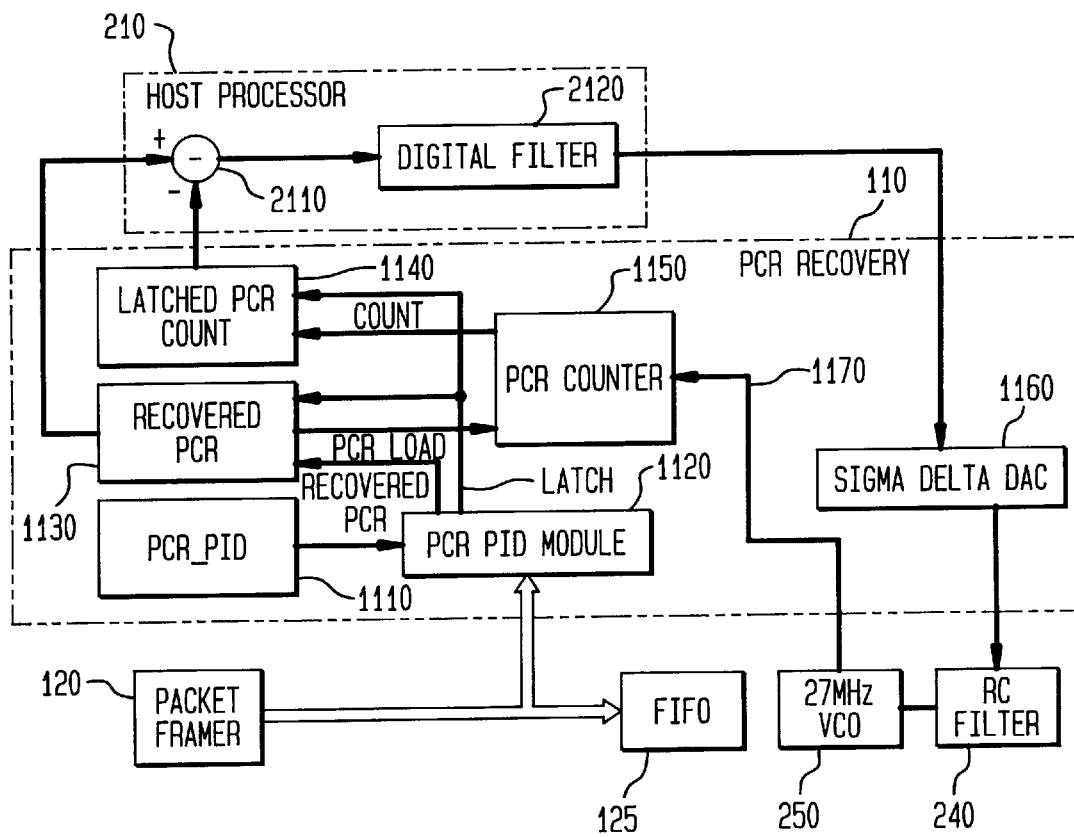
FIG. 8 illustrates the recovery of the PCR clock in greater detail.

FIG. 8 illustrates the recovery of the program clock. Initially, the host processor 210 loads the register PCR_PID 1110 with the PID of the transport packets containing the PCR of a selected program. (For sake of brevity, the host interface 130 and bus 135 are not shown in FIG. 8.) Illustratively, the host processor 210 can change the selected PCR PID stored in the PCR_PID register 1110 during normal operation (i.e., whenever a different program is selected). A PCR PID module 1120 is provided. The PCR PID module 1120 illustratively monitors the transport packets outputted form the packet framer 120 to the FIFO 125. In response to detecting a transport packet containing the same PID as in the PCR_PID register 1110, and detecting that the PCR_flag is set (indicating that a PCR is actually present in the transport packet) the PCR PID module latches the PCR contained in the detected packet into the recovered PCR register 1130. Illustratively, the PCR PID module may be implemented by a simple finite state machine which obtains the PID of each transport packet. The PCR PID module 1120 also obtains a fixed length sequence of bits from each transport packet at a predetermined offset from the PID of each transport packet. Illustratively, the fixed length sequence is two fixed length sequences equal to the number of bits in the PCR base (e.g. 33 bits) and PCR extension (9 bits) and the offset is two offsets set equal to the distance separating the location of the PCR base and extension from the PID (e.g., 33 bits of the PCR at 64 bits and 9 bits of the PCR at 88 bits) within the transport packet. The PCR PID module 1120 compares the PID stored in the PCR_PID register 1110 to the obtained PID. If they match, the obtained fixed length sequence is the desired recovered PCR. The PCR PID module 1120 thus generates a latch signal for storing values in the register 1140 and the register 1130.

A PCR counter 1150 is also provided in the PCR recovery circuit 110. Initially, the recovered PID in the register 1130 is loaded into the PCR counter 1150. In addition, if the discontinuity_indicator bit of the transport packet is set (indicating, amongst other things, that there will be a discontinuity in the encoder program clock, i.e., the PCRs), then the recovered PCR is loaded into both the registers 1130 and 1150. The PCR counter 1150 then counts in synchronism with the signal outputted via line 1170. In response to the PCR PID module latching a subsequent recovered PCR into the register 1130, the PCR counter 1150 latches its current count into the latched PCR count register 1140. The current count and recovered PCR are outputted from the registers 1140 and 1130 to the host processor 210.

In the host processor 210, the subtractor 2110 subtracts the current count from the recovered PCR. The difference thus formed is inputted to a digital filter 2120. The digital filter 2120 illustratively performs a user definable clock adjustment. Illustratively, the digital filter 2120 and subtractor 2110 are implemented in software executing on the host processor 210. Since PCR values arrive in transport packets about ten times per second, the processing resources of the host processor 210 are not too strained.

The filtered difference is outputted from the host processor 210 to a sigma delta digital to analog conversion circuit (DAC) 1160 of the PCR recovery circuit 110. The sigma delta DAC 1160 and RC filter low pass filter 240 convert the filtered difference to an analog signal. In particular, the sigma delta DAC 1160 creates a train of approximately equally spaced pulses in a fixed length time frame. The number of pulses equals the filtered difference. The RC filter 240 converts the pulses to an analog voltage signal level representing the filtered difference. The analog voltage signal is then inputted to the external 27 MHz VCXO 250. The filtered difference signal adjusts the phase of the 27 MHz VCXO 250. The phase adjustment, in turn, adjusts the count of the PCR counter 1150 (speeds up the count if the PCR counter 1150 is too slow or slows down the count if the PCR counter 1150 is too fast).

As shown in FIG. 8, the signal outputted from the 27 MHz VCXO 250 is delivered via line 1170 to the PCR counter 1150. Advantageously, however, the 27 MHz signal outputted from the 27 MHz VCXO 250 is not used directly to increment the PCR counter 1150. Instead, the 27 MHz signal is used to derive a 40.5 MHz internal clock, which in turn is used to increment the PCR counter 1150. To ensure that the PCR counter 1150 counts once every $1/27,000,000$ seconds, the PCR counter 1150 is illustratively incremented twice for every three clocks of the 40.5 MHz internal clock.

Figure 9:
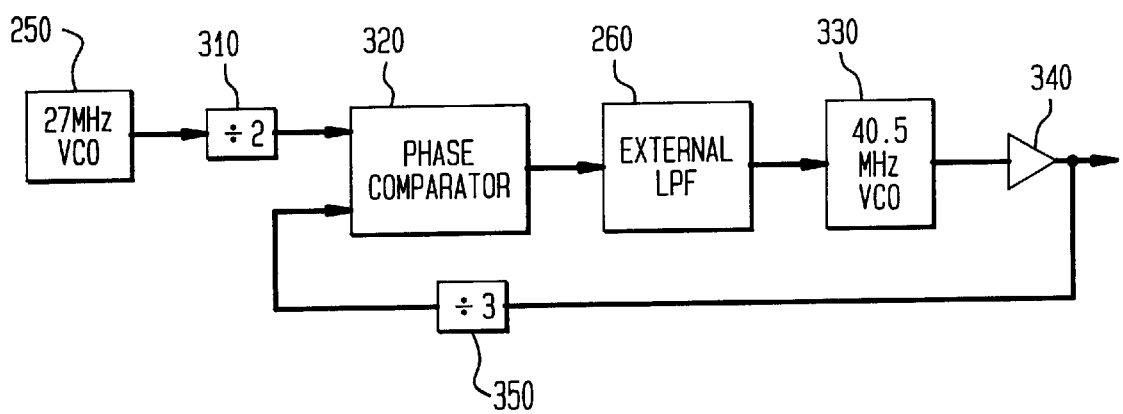
FIG. 9 illustrates the derivation of an internal clock based on the PCR clock in greater detail.

FIG. 9 illustrates a circuit for deriving the 40.5 MHz internal clock. The signal outputted from the 27 MHz VCXO is inputted to a divide by two circuit 310. The 40.5 MHz internal clock is inputted to a divide by three circuit 350. The outputs of the two dividers 310, 350 are inputted to a phase comparator circuit 320 which determines the phase difference between the two signals. The phase difference is filtered by an external low pass filter circuit 260 and the filtered phase difference signal is inputted to a 40.5 MHz VCXO 330. The phase difference adjusts the 40.5 MHz signal outputted by the 40.5 MHz VCXO. The signal outputted by the 40.5 MHz VCXO 330 is then amplified in the amplifier 340 to produce the 40.5 MHz internal clock.

Thus, the PCR's contained in the transport packets synchronize both the 27 MHz program clock and the 40.5 MHz internal clock.

Data Flow in RISC Processor

The packet framer 120 outputs transport packets to the FIFO 125. The FIFO serves to decouple the rate at which the packet framer 120 outputs the transport packets from the variable rate at which the RISC processor 150 processes the packets.

The RISC processor 150 then retrieves the transport packets one at a time, in first-in first-out order from the FIFO 125. The RISC processor 150 selects specific ones of the transport packets (in a fashion described below) and performs one of the following actions:

(1) The RISC processor 150 transfers, generally, all of the payload of the transport packet to the descrambler 220 via the descrambler interface 140, (2) The RISC processor 150 transfers the transport packet to the FIFO 155 (for transfer directly to the high speed interface 180), or (3) The RISC processor 150 extracts elementary stream data or PSI data from the transport packet and transfers the extracted data to the FIFO 155 for storage by the memory manager in the external RAM 230.

Figure 10:
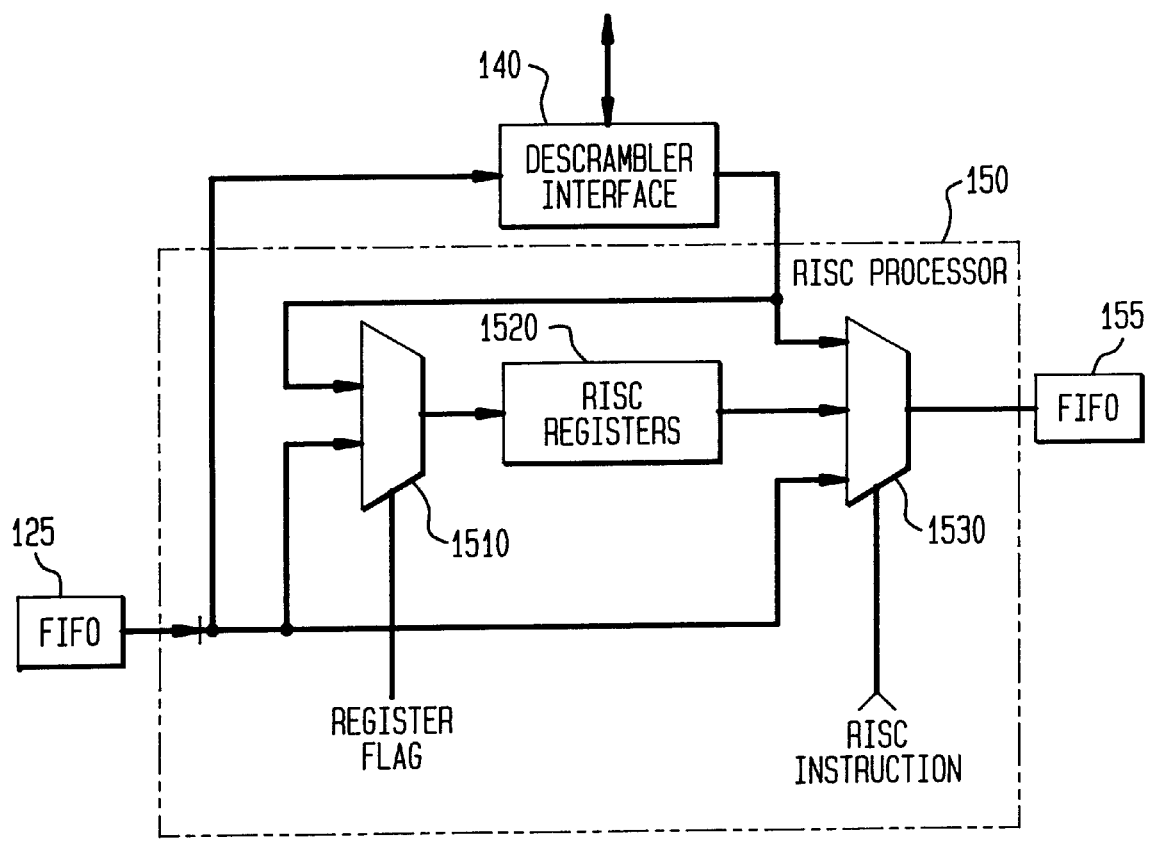
FIG. 10 illustrates the data flow hardware of the RISC processor.

FIG. 10 is a diagram illustrating the flow of data in the RISC processor 150. For sake of brevity, certain RISC processor 150 hardware is omitted such as the ALU and instruction control circuitry. The RISC processor 150 retrieves each transport packet from the FIFO 125. The RISC processor 150 determines (as described in greater detail below) from the PID of the retrieved transport packet whether or not to select the transport packet. Any transport packet which is not selected is discarded. The RISC processor 150 may determine whether or not to initially descramble the transport packet contents. Illustratively, this is achieved (as described below) by examining particular scrambling control fields in the transport packet (which scrambling control fields are provided pursuant to the MPEG-2 standard). If the transport packet contents are to be descrambled, the RISC processor 150 outputs, generally, the payload of the selected transport packet to the descrambler interface 140. This is described in greater detail below.

Alternatively, the RISC processor 150 inputs the transport packet to the multiplexer 1510 and the multiplexer 1530 (controlled by a RISC processor 150 register flag and RISC instruction, respectively). Descrambled data outputted via the descrambler interface is also inputted to the multiplexer 1510 and the multiplexer 1530. Using information on hand for the selected transport packet (described below), the RISC processor 150 generates an appropriate control signal for selecting with the multiplexer 1510 either the transport packet inputted directly from the FIFO 125 or the descrambled data outputted from the descrambler interface 140. The data selected by the multiplexer 1510 is stored in particular registers 1520 of the RISC processor 150. While in the registers 1520, the RISC processor 150 may extract elementary stream or PSI data from the information stored in the registers 1520. Such extracted data is also outputted to the multiplexer 1530. Using information on hand for the selected transport packet (described below), the RISC processor 150 generates an appropriate control signal for selecting with the multiplexer 1530 the transport packet inputted directly from the FIFO 125, the descrambled data outputted from the descrambler interface 140 or the extracted data outputted from the registers 1520. The data selected by the multiplexer 1530 is outputted via the FIFO 155 to the memory manager 160.

Transport Packet Selection and Processing

Illustratively, the RISC processor 150 executes instructions that are contained in the internal instruction/data RAM 165. The instructions may be downloaded from the host processor 210, via the host interface 130 and bus 135, to the internal instruction/data RAM 165. This provides a certain amount of flexibility in structuring the transport packet processing operation of the RISC processor 150.

As noted above, the RISC processor 150 selects prespecified transport packets and performs different prespecified processing on each selected packet. The manner in which this is achieved is now described. It should be noted that the description below contains one way, but not the only way, to select transport packets and selectively process them. By virtue of employing a RISC processor 150, other schemes may be used.

Figure 11:
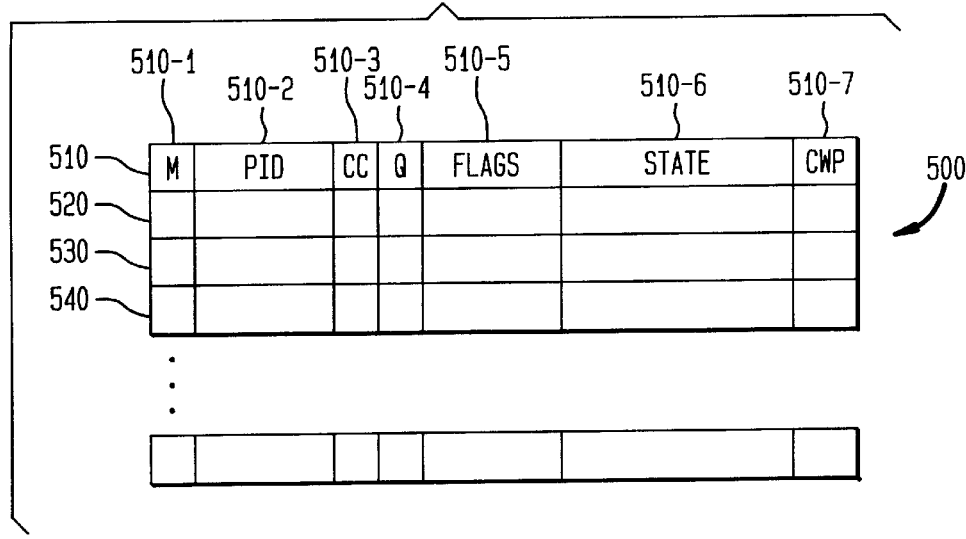
FIG. 11 illustrates a PID table data structure utilized by the RISC processor to process transport packets of the transport stream.

In addition to downloading instructions that are executed by the RISC processor 150, the host processor 210 illustratively also downloads to the internal instruction/data RAM 165 a PID table 500 such as is shown in FIG. 11. The processor 150 accesses the PID table 500 in the course of processing the transport packets. As shown, the PID table 500 includes plural PID table entries 510, 520, 530, 540, . . . . Each table entry, e.g., the table entry 510, includes a PID match flag field (1 bit) 510-1, a PID (13 bits) field 510-2, a continuity count field (4 bits) 510-3, a queue number field (e.g., 5 bits) 510-4, a flags field (10 bits) 510-5, a state field (24 bits) 510-6, and a control word pointer field (3 bits) 510-7. The PID match flag field 510-1 is an enable field. When the PID match flag is cleared, the entire PID table entry 510 is disabled and ignored by the RISC processor 150. When the PID match flag is set, the RISC processor 150 may utilize the corresponding PID table entry 510 to process the inputted transport packets.

The host processor 210 stores in the PID field 510-2 the PID of transport packets which are to be selected. For instance, the host processor 210 may store the PID used to identify transport packets that contain a selected video elementary stream. In response, the RISC processor 150 will select each transport packet labeled with the same PID as is stored in the PID field 510-2 which payload contains, amongst other things, the video elementary stream data.

The continuity count field 510-3 is utilized by the RISC processor 150 to determine if any transport packets for a given PID have been lost. Illustratively, all transport packets with a given PID are provided with a sequential number called a continuity count (which counts from zero to fifteen and then back to zero). The RISC processor 150 stores the continuity count value of the most recently received transport packet in the continuity count field 510-3. If the next received packet with the same PID has a continuity count which does not equal the continuity count stored in the field 510-3 plus one, the RISC processor 150 determines that at least one packet with the same PID was lost.

The queue number field 510-4 indicates the location in which payload data extracted from a selected transport packet with the same PID as in field 510-2 should be stored.

Illustratively, as discussed in greater detail below, each PID table entry 510, 520, 530, 540, . . . may be assigned a queue in which the RISC processor 150 stores the corresponding elementary stream data extracted from received transport packets. A value may also be stored in the queue number field 510-4 called a "pseudo queue" number (discussed below) indicating that the entire transport packet, or part thereof, should be outputted to the high speed interface 180.

The purpose of the flags field 510-5 and state field 510-6 are similar. Both relate to enabling the RISC processor 150 to alter processing of certain transport packets with specific PIDs. The flags field 510-5 contains miscellaneous flags which can have a fixed or dynamic meaning depending on the instructions provided to the RISC processor 150.

The state field 510-6 is more specific. The state field contains information pertaining to transport packet field that are divided amongst multiple packets. Consider that the transport stream is likely to contain many elementary streams of many different programs which have been multiplexed together. Consider also that a PES packet can be of variable length and therefore may be divided over several particular transport packets. Certain important information such as PTSs and DTSs can "span," i.e. be distributed over more than one of these particular transport packets. Other transport packets containing other unrelated data may be interspersed amongst these particular transport packets by virtue of the multiplexing. Thus, the RISC processor 150 may receive a transport packet that contains only part of a PES packet followed by other unrelated transport packets. In such a case, the RISC processor 150 may store state information in the state field 510-6 for assisting the RISC processor 150 in properly continuing processing when the next related transport packet is received. For instance, if the RISC processor 150 retrieves only part of a PTS in a first packet, the RISC processor 150 may store state information in the state field 510-6 indicating that the data of the next related transport packet contains the remaining portion of the PTS.

The control word field 510-7 contains an index to a "control word pair" or pair of descrambling keys in the "control word" or key table. Illustratively, MPEG-2 provides for a pair of keys for use in descrambling referred to as the even key and the odd key. Only one key is actively used at one time so that the other key may be contemporaneously updated. Illustratively, keys are themselves encrypted in the ECMs. When an ECM is received for a particular elementary stream, the RISC processor 150 stores the ECM in the external RAM 230. The host processor 210 accesses the external RAM 230 via the host interface 130, bus 135 and memory manager 160 to obtain the ECM. The host processor 230 then decrypts the key from the ECM, for example, using a "smart card" or ROM (not shown) that contains a private key for decrypting the ECM. The host processor 230 then stores the decrypted key in the appropriate location in the control word table (maintained in the internal instruction/data RAM 165), and if necessary, updates the control word field 510-7.

The transport packet processing by the RISC processor 150 is now explained. The RISC processor 150 sequentially retrieves each transport packet from the FIFO 125. The RISC processor 150 extracts the PID of the retrieved transport packet and compares the extracted PID to the PID stored in the PID field (e.g., 510-2, 520-2, . . . ) of each PID table entry 510, 520, . . . which has the PID match flag 510-1, 510-2, . . . set to enable. If the extracted PID does not match any PIDs stored in the enabled PID table entries, the RISC processor 150 discards the packet. However, if the extracted PID matches the PID stored in the PID field, e.g., the PID field 520-2, the RISC processor 150 selects the transport packet.

Next, the RISC processor 150 determines the ultimate destination of the transport packet. The RISC processor 150 determines in which queue (or pseudo queue) to store the extracted elementary stream data (of the PES packet payload) from the queue number field 520-4. Next, the RISC processor 150 determines whether or not the transport packet contents are scrambled. If so, the RISC processor 150 outputs the transport packet (or a part of the transport packet) to the descrambler interface 140 as described in greater detail below. In so doing, the RISC processor 150 may retrieve a key stored in the control word table as indicated by the control word pointer field 520-7. Note that the RISC processor 150 outputs appropriate control signals to the multiplexers 1510 and 1530 of FIG. 10 base on these two determinations.

If the ultimate destination of the transport packet data is the high speed interface 180, the RISC processor 150 outputs the entire transport packet data via the multiplexer 1530 (FIG. 10), FIFO 155, and memory manager 160 to the high speed interface 180. However, if the transport packet is scrambled, the transport packet data is first descrambled before it is outputted to the high speed interface 180.

Assume that the ultimate destination of the transport packet data is one of the queues. The RISC processor 150 then extracts the continuity count of the retrieved packet and compares it to the continuity counter stored in the continuity count field 520-3 of the PID table entry 520 (with the corresponding PID stored in the PID field 520-2). If the extracted continuity count does not equal the stored continuity count plus one then the RISC processor 150 signals a packet loss error. The RISC processor 150 then stores the extracted continuity count in the continuity count field 520-2 of the PID table entry 520.

In the case the transport packet contains PES packet data, the RISC processor extracts the PES packet payload data from the retrieved transport packet (based upon predetermined location, as per the MPEG-2 standard, for finding such data). The RISC processor 150 then stores the extracted data in the queue indicated in the queue number field 520-4. The storage of extracted data in queues is discussed in greater detail below.

In the case the transport packet contains PSI, the RISC processor 150 retrieves the PSI (based on the predetermined location or indicator in the transport packet, as per the MPEG-2 standard, for finding such PSI) and stores the PSI in (a queue of) the external RAM 230. For instance, the RISC processor 150 may maintain the PMT in a specified queue in the external RAM 230 which can be accessed by the host processor 210. Alternatively, PSI may be stored in the internal instruction/data RAM 165. As noted above, the RISC processor 150 uses the information stored in the flags field 520-5 and status field 520-6 to modify the processing of packets. For example, the status field 520-6 accordingly enables the RISC processor 150 to complete processing transport packet data which is divided amongst a number of transport packets. The RISC processor 150 modifies the processing of packets according to these fields 510-5, 510-6.

It is worthy to explain how the host processor 210 determines which PIDs it is interested in. Assume that multiple transport streams are received. A default transport stream is inputted to the transport stream decoder/demultiplexer 100. The host processor 210 stores PID 0×00 (for the PAT) in the PID table 500. This causes the RISC processor 150 to extract the PAT and to store the PAT in the external RAM 230. The host processor 210 accesses the PAT in the external RAM 230 to determine the PID of the transport packets containing the NIT. The host processor 210 stores the PID of the NIT in the PID table 500. This causes the RISC processor 150 to extract the NIT and store the NIT in the external RAM 230. The host processor 210 accesses the NIT in the external RAM 230 to determine which transport stream contains a desired program to be viewed (i.e., selected by a user). The host processor 210 then causes the appropriate transport stream to be inputted to the transport stream decoder/demultiplexer 100.

Next, the host processor 210 once again stores PID 0×00 (for the PAT) in the PID table 500. This causes the RISC processor 150 to extract the PAT of this transport stream which is stored in the external RAM 230. The host processor 210 accesses the PAT and obtains the PID for PMT pertaining to the desired program. The host processor 210 stores the PID for the PMT in the PID table 500. In response, the RISC processor extracts the corresponding PMT entries (which are stored in the external RAM 230). The host processor 210 accesses the PMT and locates the elementary stream information pertaining to the desired program including, amongst other things, the PID for each elementary stream.

Memory Management

The memory manager 160 provides access to the external RAM 230 for the RISC processor 150, external host 210, video interface 170 and audio interface 175. In particular, the memory manager 160 maintains queues in the external RAM 230 in which the RISC processor 150 stores elementary stream (and PSI) data and from which the video interface 170 and audio interface 175 read the stored elementary stream data. In addition, the memory manager 160 provides direct access by the external host processor 210 to the external RAM 230. The memory manager 160 furthermore provides for high speed transfer of transport packets to an external device connected to the high speed interface 180.

Figure 12:
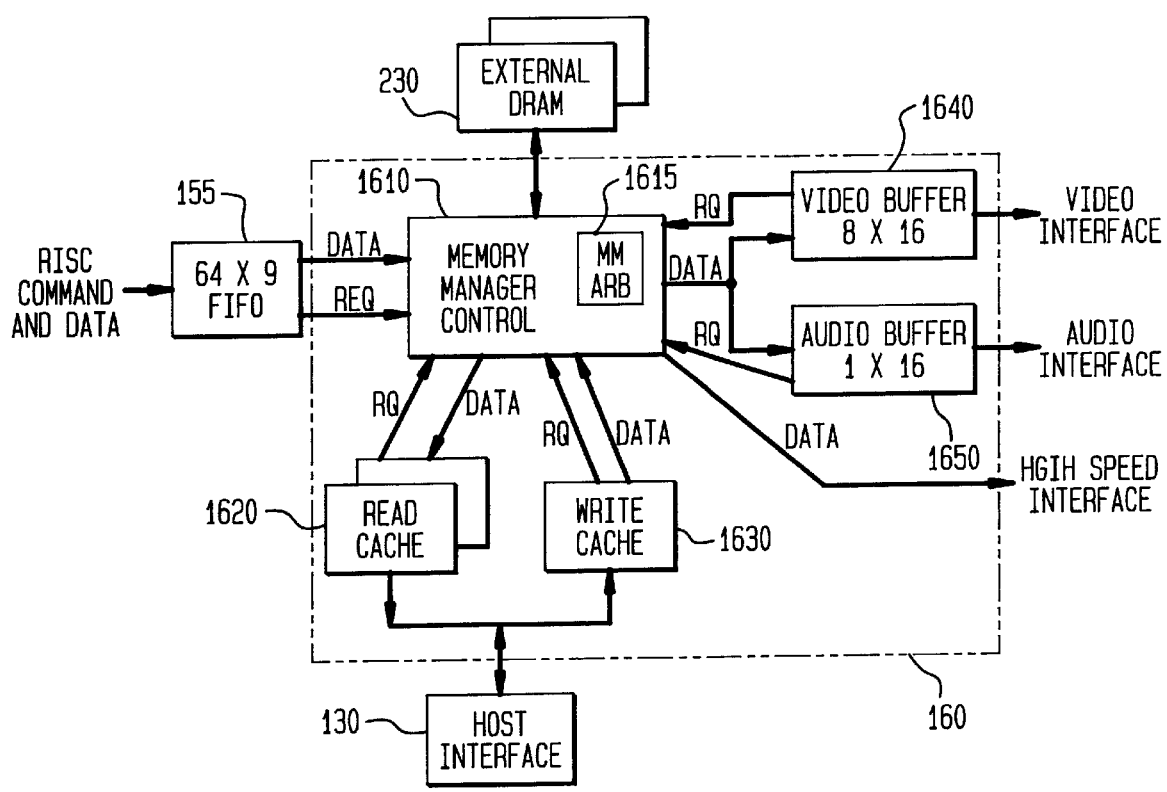
FIG. 12 illustrates the memory manager in greater detail.

FIG. 12 illustrates the memory manager 160 in greater detail. As shown, the memory manager 160 may receive requests to write data from the RISC processor 150, requests to read data from the video interface 170 and audio interface 175 and both read and write requests from the host processor 210 (via the host interface 130). Data to be outputted by the high speed interface is transferred directly thereto (as such data is not stored in the external RAM 230). As noted above, a 64×9 FIFO 155 is provided for buffering requests to store data in queues (and the data to be stored). In addition, the memory manager 160 has a video buffer 1640 for buffering outgoing retrieved video data. Likewise, the memory manager 160 has an audio buffer 1650 for buffering outgoing retrieved audio data. For the host processor 210, the memory manager 160 also has a one word write cache for buffering data to be written and a four word read cache 1620 for buffering outgoing read-out data. Thus, each device which desires to access the external RAM 230 has the ability to submit a request without being suspended even if the memory manager 160 is busy serving a different device.

A memory manager controller 1610 is also provided. Illustratively, the memory manager controller 1610 may be implemented with a simple processor or finite state machine. The memory manager controller 1610 illustratively includes a memory manager arbiter 1615 to further ensure fair and orderly access to the external RAM 230 for the RISC processor 150, the host processor 210, the video interface 170 and the audio interface 175. The memory manager arbiter 1610 utilizes an approximate round-robin scheme for servicing the requests in the FIFO 155, the read cache 1620, the write cache 1630, the audio buffer 1650 and the video buffer 1640. However, the round-robin servicing of requests is tailored to suit the requirements of each accessing device. Thus, the RISC processor 150 and video interface 170 may obtain more service on average than the audio interface 175 and host processor 210 since the RISC processor 150 and video interface 170 have a very high throughput.

The host processor 210 may access the queues or may directly access specific locations of the external RAM 230. First, direct access by the external host processor 210 is described. If the host processor 210 has only a single word to write, the host processor 210 need not wait for the memory manager 160 to be available to service the write operation. Rather, the memory manager 160 may simply load the address and word to be written into the write cache 1630. The memory manager controller 1610, in turn, performs the write operation when it is ready using the address and word stored in the write cache 1630.

When the external host processor 210 issues a read request, the memory manager controller 1610 first determines whether or not the requested word is in the read cache 1620. If so, the read is satisfied from the read cache 1620, thereby avoiding unnecessary accesses to the external RAM 230. The memory manager 160 only performs the read access to the external RAM if the word to be read is not already in the read cache 1620.

As noted above, in addition to enabling direct memory access to the external RAM 230, the memory manager controller 1610 maintains plural queues in the external RAM 230. The RISC processor 150 stores data in one of the queues by issuing a write request to the memory manager 160 which includes the data to be written and which specifies the number of the queue in which the data is to be stored. The memory manager controller 1610, in turn, stores the data outputted by the RISC processor 150 in the designated queue. Likewise, the host processor 210 can store data in a queue by issuing a write request and providing the queue in which the data is to be stored.

Illustratively, a first queue numbered 0 is provided for storing video elementary stream data. When the video interface 170 desires to output video elementary stream data, the video interface 170 simply issues a video request signal to the memory manager 160. The memory manager controller 1610, in turn, sequentially delivers the video elementary stream data in the video queue 0 to the video interface 170. Likewise, a second queue numbered 1 is provided for storing audio elementary stream data. As with the video interface 170, the audio interface 175 can simply issue an audio request signal to the memory manager 160 when it desires to receive audio elementary stream data. In response, the memory manager controller 1610 delivers the audio elementary stream data in the audio queue 1 to the audio interface. Fourteen user defined queues numbered 2–15 are provided for transferring transport packet payload data. The transport packet payload data in these queues may be read out by the host processor 210 in a similar fashion as the video and audio interface with certain differences described below. Finally, a "pseudo queue" numbered 16 is provided for fast transfer of selected transport packets or transport packet payload data to the high speed interface 180. This queue is referred to as a pseudo queue because data directed to queue 16 is never actually stored in the external RAM 230. Rather, the memory manager controller 1610 outputs the data directly to the high speed interface 180.

Figure 13:
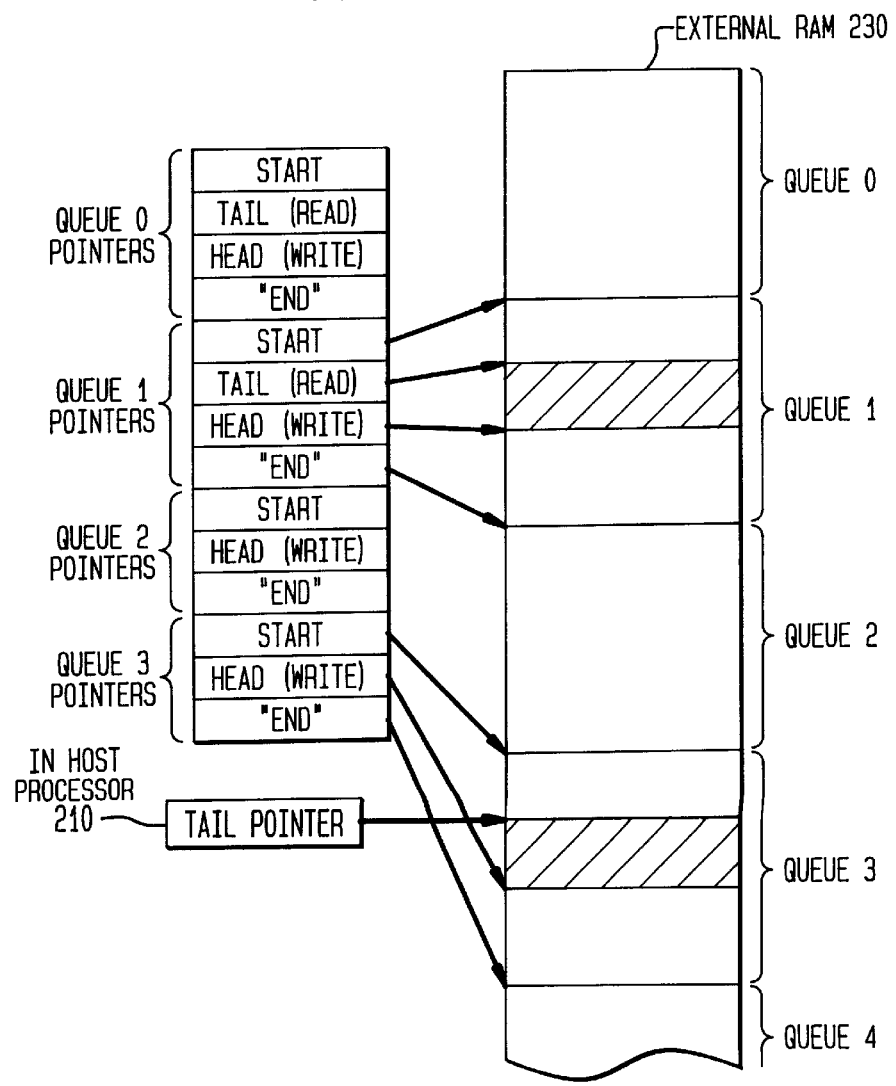
FIG. 13 illustrates the implementation of queues by the memory manager in separately storing the data of each elementary stream.

FIG. 13 illustrates the maintenance of queues by the memory manager controller 1610. Illustratively, the memory manager controller 1610 maintains a set of pointers for each queue numbered 0–15. For the video and audio queues, the memory manager controller 1610 maintains pointers to the start location of the queue and pointers to the tail and head of the queue. The memory manager controller 1610 also keeps track of the end of each queue using the start pointer and information regarding the size of the queue. Illustratively, each queue operates like a circular buffer with "wrap-around" addressing. That is, the tail and head pointers initially point to the same external RAM 230 address as the start pointer. In writing data to a queue, the memory manager controller 1610 writes the first data word in the address of the external RAM 230 pointed to by the tail pointer. The memory manager controller 1610 increments the tail pointer, and writes the second data in the address pointed to by the tail pointer, etc. In reading data from a queue, the memory manager controller 1610 reads out a first data from the external RAM 230 address pointed to by the head pointer. The memory manager controller 1610 increments the head pointer by one and reads out the second data from the address pointed to by the head pointer, etc. When the tail or head pointer reaches the end of the queue, the very next write (in the case of the tail pointer) or read (in the case of the head pointer) cause the memory manager controller 1610 to reset the tail or head pointer to point to the address in the external RAM 230 pointed to by the start pointer.

In the case of the user defined queues 2–15, the memory manager controller 1610 only maintains the start and tail pointers of the queues. The host processor 210 maintains the head pointers of these queues. Thus, the host processor 210 specifies the location in the queue from which it wishes to read-out data. The reading of data from, and the writing of data to, the user defined queues is otherwise similar to the reading of data from and the writing of data to the video and audio queues.

Illustratively, whenever the memory manager controller 1610 writes a burst of data to a particular queue, the memory manager controller 1610 sets a particular interrupt bit of an interrupt pending register which particular bit corresponds to the queue in which data was written. Likewise, the host processor 210 sets bits of an interrupt mask register corresponding to each queue for which the host processor 210 wishes to receive interrupts. When a bit for a particular queue is set in the interrupt pending register and the corresponding bit is also set in the interrupt mask register, an interrupt is generated in the memory manager controller 1610 and communicated, either via an interrupt pin of the transport stream decoder/demultiplexer 100 or via the bus 135 and host interface 130 to the host processor 210. Illustratively, this is achieved by simply logically OR-ing all of the interrupt pending register bits (which are enabled by the interrupt mask register) together in a logic OR gate. In response, the host processor 210 may examine the interrupt pending register to determine which queues contain data that may be read out. (While servicing the interrupt, the host processor 210 clears the interrupt generating bits of the interrupt pending register.)

Advantageously, the size of each queue is selectable. In order to provide selectable queue sizes, a register is assigned to each queue. The host processor 210 may store a value indicative of the size of a particular queue in its corresponding register. Illustratively, a four bit value $q_{13}$ size may be stored in each register for purposes of setting the size of each queue. The memory manager controller 1610 determines the corresponding queue size using the following formula:

$$\text{queue size} = 2^{q\_size} \cdot 16 \text{ bytes}$$

Video and Audio Interfacing

As noted above, the video interface 170 and audio interface 175 retrieve video and audio data and provide the retrieved video or audio data to an external video decoder 62 or audio decoder 64. Both the video interface 170 and audio interface 175 are similar in architecture. Therefore, only the video interface 170 is discussed. Illustratively, the video interface 170 can output data one byte at a time or one bit at a time while the audio interface 175 can only output data one bit at a time.

Figure 14:
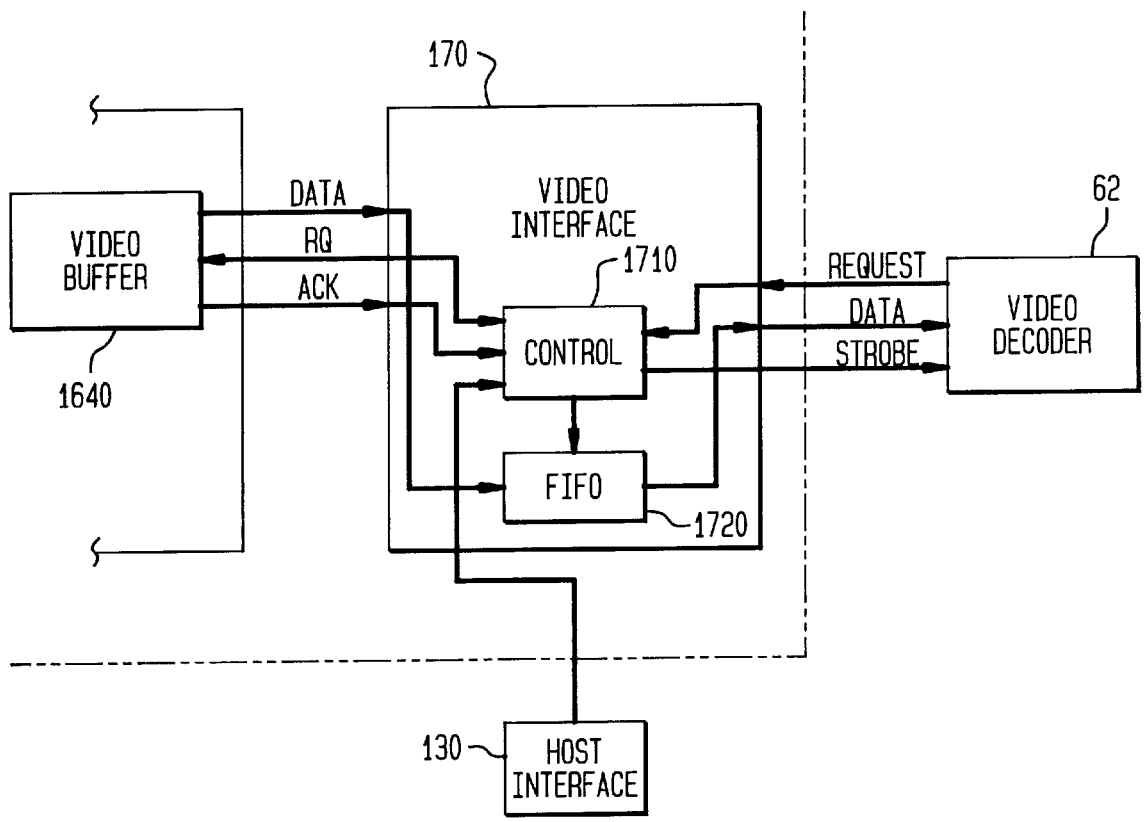
FIG. 14 illustrates the video interface in greater detail.

As shown in FIG. 14, the video interface 170 includes a video controller 1710 and a FIFO 1720. Illustratively, the video controller 1710 is implemented using a finite state machine. The video interface 170 receives from the host processor 210 information regarding the maximum data rate at which to transfer data. In response to a request signal from the external video decoder 62, the video controller 1710 transfers data stored in the FIFO 1720 at the maximum data rate programmed by the host processor 210. While transferring valid data, the video controller 1710 also outputs a strobe signal in synchronism with the outputted data. The video controller 1710 also monitors the capacity of the FIFO 1720 and issues sufficient requests to obtain more data to the video buffer 1640 of the memory manager 160 in order to maintain the fullness of the FIFO 1720. When data is transferred back from the FIFO 1640, an acknowledgment signal is also transmitted to the video controller 1710.

Descrambling

According to MPEG-2, PES packet payload data or both the PES packet header and payload data may be scrambled. Transport packet headers and PSI may not be scrambled. The transport stream decoder 100 supports both kinds of allowable scrambling.

Assume that either the PES packet payload or both the PES packet header and PES packet payload are scrambled. Initially, the RISC processor 150 identifies and transfers an initial eight-byte key to the descrambler 220 via the descrambler interface 140. Illustratively, the initial key may be a private key contained in a "smart card" or ROM connected to the host processor 210.

Next the RISC processor 150 determines what kind of scrambling is used (PES packet payload or PES packet payload and header scrambling, using an odd or an even key). Illustratively, an indication of the type of scrambling used is contained in either the transport packets bearing scrambled PES packet header and payload data or in the PES packets containing only scrambled PES packet data. Thus, the RISC processor 150 first examines the value stored in the transport_scrambling_control field of the received transport packets. This field indicates that the transport packet payload (entire PES packet) is: (1) scrambled using an even key; (2) scrambled using an odd key; or (3) not scrambled. If (1) or (2) is indicated, the RISC processor 150 outputs the appropriate even or odd key (contained in the control word table described above) to the descrambler 220 via the descrambler interface 140. The RISC processor 150 then outputs the transport packet payload, to the descrambler 220 via the descrambler interface 140.

If the transport_scrambling_control field indicates that the transport packet payload is not scrambled, then at least the PES packet header is not scrambled. However, it is possible that only the PES packet payload is scrambled. The RISC processor 150 thus examines the PES_scrambling_ control field. Like the transport_scrambling_control field, the PES_scrambling_control field indicates that the PES packet payload is: (1) scrambled using an even key; (2) scrambled using an odd key; or (3) not scrambled. If (1) or (2) is indicated, the RISC processor 150 outputs the appropriate even or odd key to the descrambler 220 via the descrambler interface 140. The RISC processor 150 then outputs the PES packet payload to the descrambler 220 via the descrambler interface 140. Note that if neither the transport packet payload nor the PES packet payload are scrambled, the RISC processor 150 need not output either the initial key or an even or odd key to the descrambler 220.

Figure 15:
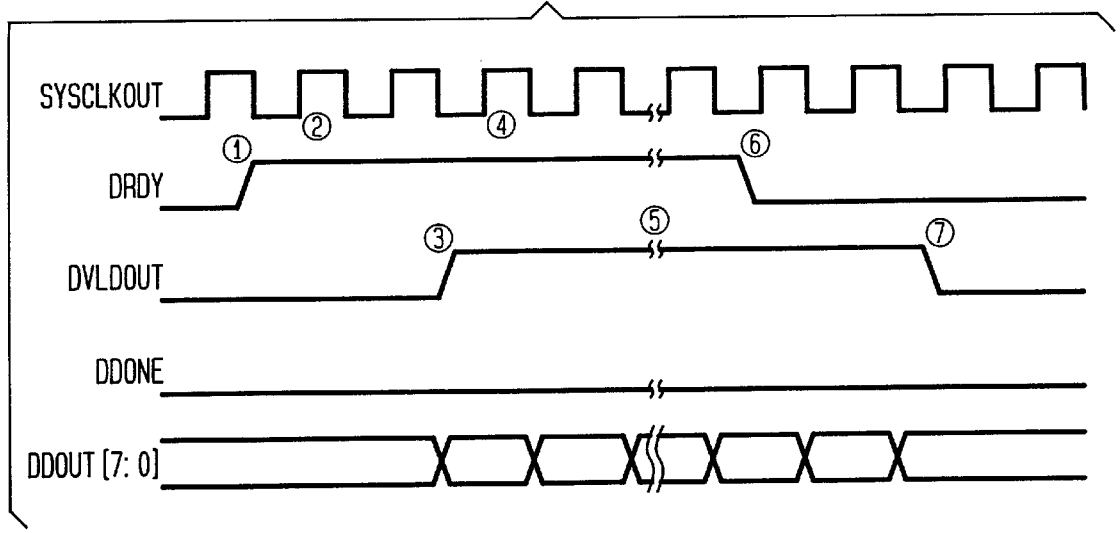
FIGS. 15–17 are timing diagrams which illustrate the transfer of data between the descrambler interface and an external descrambler.
Figure 16:
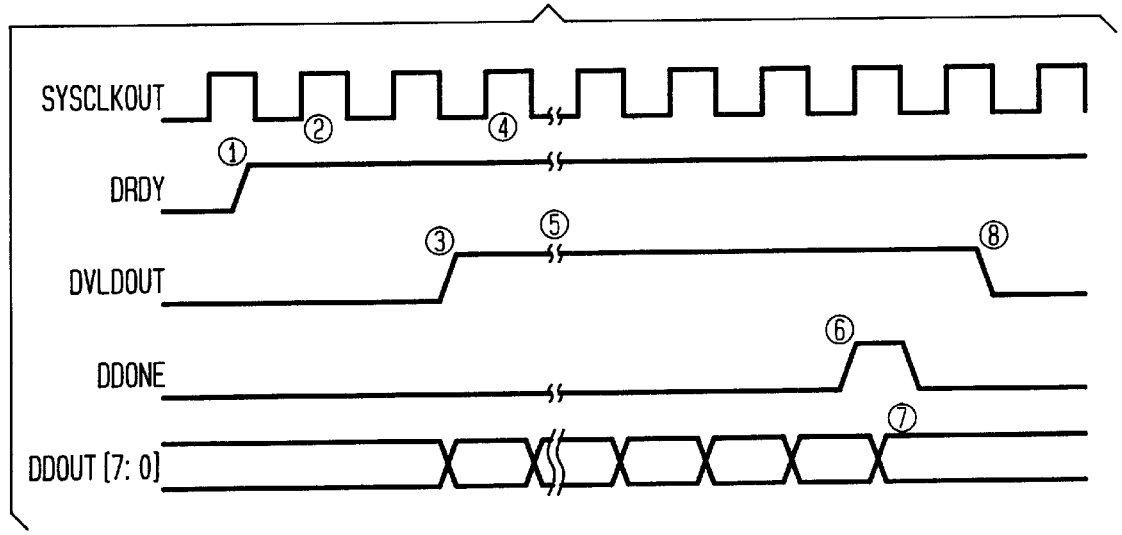
Figure 17:
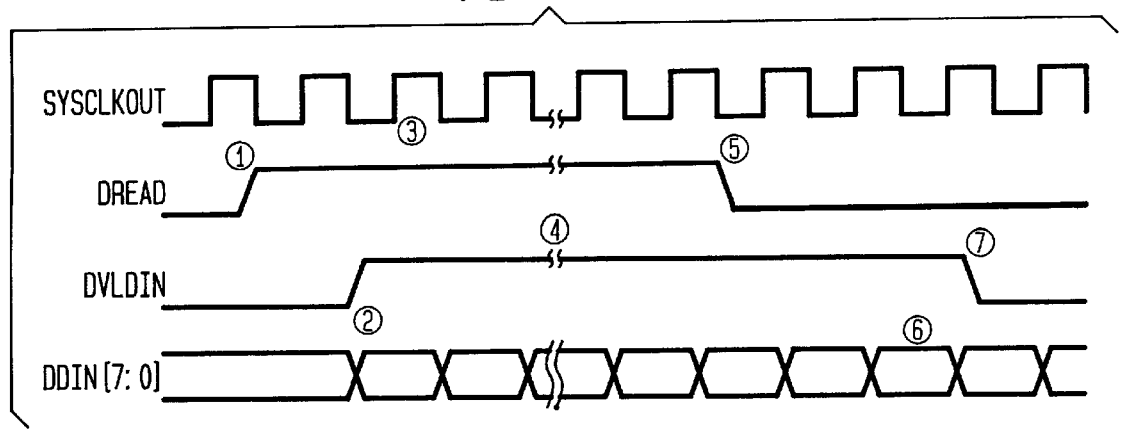

Illustratively, the descrambler interface 140 and descrambler 220 observe a handshaking protocol for transferring data. This is illustrated in FIGS. 15–17. In these figures:

SYSCLKOUT is the transport stream decoder 100 40.5 MHZ system clock

DRDY is a signal asserted by the descrambler 220 when it is ready to receive scrambled data or keys DVLDOUT is a signal asserted by the descrambler interface 140 when it transfers data on DDOUT[7:0] to indicate that the data thereon is valid DONE is a signal asserted by the descrambler interface 140 to indicate that it is transferring the last byte (of scrambled data and keys, collectively) DDOUT[7:0] is the data transferred from the descrambler interface 140 to the descrambler 220 wherein data is transferred one byte per SYSCLKOUT DREAD is a signal asserted by the descrambler interface 140 when it is ready to receive data DVLDIN is a signal asserted by the descrambler 220 when it transfers data on DDIN[7:0] to indicate that the data thereon is valid DDIN[7:0] is the data transferred from the descrambler 220 to the descrambler interface 140 wherein data is transferred one byte per SYSCLKOUT.

FIGS. 15–16 illustrate timing diagrams for transferring data to the descrambler 220. When the descrambler 220 is ready to receive scrambled data or keys, the descrambler asserts DRDY. The descrambler interface 140 responds by asserting DVLDOUT and outputting data (scrambled data, initial key or even or odd key) on DDOUT[7:0]. This continues until the descrambler 220 has accepted all the data it can hold or until the descrambler interface 140 runs out of data to transfer. The former case is illustrated in FIG. 15. When the descrambler 220 is nearly full (two bytes short of full), the descrambler 220 deasserts DRDY. In response, the descrambler interface 140 deasserts DVLDOUT and stops transferring data on DDOUT[7:0]. Illustratively, it takes the descrambler interface two clock cycles of SYSCLKOUT to respond to the deassertion of DRDY.

The latter case, in which the descrambler interface 140 runs out of data to transfer, is depicted in FIG. 16. When the descrambler interface 140 reaches the last byte, the descrambler interface asserts DDONE simultaneously while outputting its last byte. The descrambler interface 140 then deasserts DVLDOUT and stops transferring data on DDOUT[7:0].

FIG. 17 depicts the transfer of data from the descrambler 220 to the descrambler interface 140. When the descrambler interface 140 is ready to receive descrambled data, the descrambler interface 140 asserts DREAD. The descrambler 220 responds by asserting DVLDIN and by transferring descrambled data on DDIN[7:0]. When the descrambler interface 140 has accepted nearly all of the data it can hold (three bytes short of full), the descrambler interface 140 deasserts DREAD. The descrambler responds by deasserting DVLDIN and stopping the flow of descrambled data on DDIN[7:0]. However, the descrambler 220 may take up to three cycles to respond to the deassertion of DREAD.

As noted above, the RISC processor 150 initially transfers the initial key, odd and even keys and scrambled data to the descrambler 220 via the descrambler interface 140. Illustratively, the RISC processor 150 only transfers data of PES bearing transport packets having PIDs which the host processor 210 has indicated should be selected. After receiving descrambled data, the RISC processor 150 may further process the descramble data, i.e., place the elementary stream data contained therein in the appropriate queue 0–15, or may simply output the entire descrambled packet contents via the pseudo queue to the high speed interface 180. It is also possible to instruct the RISC processor 150 to avoid descrambling the transport packet contents and to simply output specified packets directly to the high speed interface 180.

In short, a transport stream decoder/demultiplexer is provided which is simple yet flexible. The decoder illustratively includes a packet framer for synchronizing to transport packets in a received transport stream and for outputting transport packets. A program clock recovery circuit is provided for recovering a program clock from PCR values contained in selected transport packets. A processor is provided for extracting elementary stream data from transport packets labeled with PIDs that are specified by a host processor. The processor separately stores the elementary stream data of each stream. A host processor interface is also provided for transferring data between an external host processor and the program clock recovery circuit. Illustratively, a memory manager may be provided for storing the data extracted by the processor for each elementary stream in a corresponding queue. The queues are illustratively maintained by the memory manager in an external RAM. A descrambler interface may be provided for transferring scrambled data and data derived from conditional access information between the processor and an external descrambler. In addition, at least one elementary stream interface, such as a video interface or audio interface, may be provided for outputting extracted elementary stream data for a particular elementary stream from a corresponding queue. Furthermore, a high speed interface may be provided for outputting transport packet data with minimal processing by the processor. The architecture according to the present invention is sufficiently simple to construct on a single integrated circuit yet flexible.

Finally, the above-discussion is merely illustrative of the invention. Numerous alternative embodiments may be devised by those having ordinary skill in the art without departing from the spirit and scope of the following claims.

The invention claimed is:

1. A transport stream demultiplexer for demultiplexing program data from transport packets, each of said transport packets having a packet identifier PID, a unique PID being assigned to packets carrying program clock references PCRs of a desired program, said apparatus comprising:

a first processor for extracting said unique PID assigned to transport packets carrying said PCRs of said desired program, a PCR circuit responsive to said unique PID, for extracting each PCR from each received transport packet having said unique PID, a PCR counter for producing a PCR clock count in response to a clock signal received at a clock input, an external host processor interface, for transferring to a second external processor one or more values on which a difference between a PCR clock count from said PCR counter and an extracted PCR from said PCR circuit depends and for receiving from the second external processor a digitally filtered PCR clock phase error based on said difference between said PCR clock count and said extracted PCR, and a digital to analog converter for converting said digitally filtered PCR clock phase error to analog form, and feeding said analog form of said digitally filtered PCR clock phase error via at least a voltage controlled oscillator VCXO to said clock input of said PCR counter, wherein an output of the VCXO is received at said clock input as said clock signal, so as to adjust a phase error of said PCR counter relative to said extracted PCR.

2. The demultiplexer of claim 1 wherein the second external processor is selectively programmable to digitally filter said difference between said PCR clock count and said extracted PCR to produce said phase error in a user-definable fashion.

3. The demultiplexer of claim 1 wherein said external host processor interface transfers from said first processor to said second external processor a program definition of said desired program, including said unique PID, and wherein said external host processor interface transfers said unique PID from said second external processor to said PCR circuit.

4. The transport stream demultiplexer of claim 1 wherein:

said first processor responds to selected PIDs by extracting elementary stream data from only particular ones of said transport packets that contain one of said selected PIDs, and separately stores said extracted data of each elementary stream in a memory.

5. The transport stream demultiplexer of claim 4 further comprising:

a descrambler interface, for receiving from said first processor scrambled data contained in at least some of said transport packets containing selected PIDs and for outputting descrambled data to said first processor.

6. The transport stream demultiplexer of claim 4 wherein said memory in which said first processor stores said external data is an external RAM, said transport stream demultiplexer further comprising:

a memory manager for managing the external RAM, for storing at least some of said extracted data and for transferring data between the external RAM and said external host processor interface.

7. The transport stream demultiplexer of claim 6 wherein said first processor causes said memory manager to store said extracted data of each stream in a separate queue maintained by said memory manager in the external RAM.

8. The transport stream demultiplexer of claim 7 wherein said memory manager maintains, for each queue, the start address of the queue in the external RAM, and the tail address of the queue in the external RAM.

9. The transport stream demultiplexer of claim 8 wherein, for at least some of said queues, said memory manager also maintains the head address of at least one of said queues in the external RAM.

10. The transport stream demultiplexer of claim 6 wherein each of said queues has an independently selectable size.

11. The transport stream demultiplexer of claim 6 further comprising:

at least one elementary stream interface, for obtaining extracted data from said memory manager for a specific elementary stream and for outputting said extracted data obtained from said memory manager to an external elementary stream decoder.

12. The transport stream demultiplexer of claim 11 further comprising:

an internal memory in which said external host processor interface stores a table containing a plurality of entries, including at least one entry which indicates a particular PID and whether or not said at least one table entry is active, said first processor accessing said table for each transport packet, and extracting elementary stream data from only said transport packets containing a PID that matches one of said particular PIDs of each of said table entries indicated as being active.

13. The transport stream demultiplexer of claim 1 wherein the VCXO is an external VCXO, wherein an input of an external RC filter is connected to an output of said digital to analog converter wherein an input of the external VCXO is connected to an output of the RC filter, wherein an output of the external VCXO is connected to said clock input of said PCR counter, and wherein said digital to analog converter is a sigma delta digital to analog converter.

14. A method for demultiplexing program data from transport packets of a transport stream, each of said transport packets having a PID, a unique PID being assigned to packets carrying PCR's of a desired program, said method comprising the steps of:

using a first processor, extracting said unique PID assigned to transport packets carrying said PCRs of said desired program, in response to said unique PID, extracting each PCR from each received transport packet having said unique PID, producing a PCR clock count in response to a clock signal received at a clock input, transferring to a second external processor one or more values on which a difference between a PCR clock count and an extracted PCR depends and for receiving from the second external processor a digitally filtered PCR clock phase error based on said difference between said PCR clock count and said extracted PCR, and converting said digitally filtered PCR clock phase error to analog form, and feeding said analog form of said digitally filtered PCR clock phase error via at least a voltage controlled oscillator VCXO to said clock input, wherein an output of the VCXO is received at said clock input as said clock signal, so as to adjust a phase error of said PCR clock count relative to said extracted PCR.

15. The method of claim 14 further comprising the step of:

selectively programming the second external processor to digitally filter said difference between said PCR clock count and said extracted PCR to produce said phase error in a user-definable fashion.

16. The method of claim 14 further comprising the steps of:

transferring from said first processor to said second external processor a program definition of said desired program, including said unique PID, and receiving from said second external processor, said unique PID for use in said step of extracting each PCR.

17. The method of claim 14 further comprising the step of:

in response to selected PIDs, using said processor to extract elementary stream data from only particular ones of said transport packets that contain one of said selected PIDs, and to store separately said extracted data of each elementary stream in a memory.

18. The method of claim 17 comprising the steps of:
transferring from said first processor to a descrambler scrambled data contained in at least some of said transport packets containing selected PIDs, and
transferring descrambled data from the descrambler to said first processor.

19. The method of claim 17 wherein said memory in which said first processor stores said extracted data is an external RAM, said method further comprising the steps of:
using a memory manager, managing the external RAM, storing at least some of said extracted data in the external RAM, and transferring data between the external RAM and the second external processor.

20. The method of claim 19 further comprising the step of:
using said first processor and said memory manager, storing said extracted data of each stream in a separate queue maintained by said memory manager in the external RAM.

21. The method of claim 20 further comprising the step of:
using said memory manager, maintaining for each queue the start address of said queue in the external RAM, and the tail address of said queue in the external RAM.

22. The method of claim 21 further comprising the step of:
using said memory manager, maintaining the head address of at least one of said queues in the external RAM.

23. The method of claim 20 wherein each of said queues has an independently selectable size.

24. The method of claim 17 further comprising the steps of:
obtaining extracted data from said memory manager for a specific elementary stream, and
outputting said extracted data obtained from said memory manager to an external elementary stream decoder.

25. The method of claim 24 further comprising the steps of:
storing in an internal memory a table containing a plurality of entries, including at least one entry which indicates a particular PID and whether or not said at least one table entry is active,
using said first processor, accessing said table for each transport packet, and extracting elementary stream data from only said transport packets containing a PID that matches one of said particular PIDs of each of said active table entries indicated as being active.

26. The method of claim 14 wherein the VCXO is an external VCXO, said method further comprising the steps of:
using an external RC filter, low pass filtering said analog form of said digitally filtered PCR clock phase error,
inputting said low pass filtered, digitally PCR clock phase error to the external VCXO, and
outputting said clock signal from the external VCXO to said clock input,
wherein said step of converting said digitally filtered PCR clock phase error to analog form comprises using a sigma delta digital to analog converter.

27. A bitstream produced by a method for demultiplexing program data from transport packets of a transport stream, each of said transport packets having a PID, a unique PID being assigned to packets carrying PCR's of a desired program, said method comprising the steps of:
using a first processor, extracting said unique PID assigned to transport packets carrying said PCRs of said desired program,
in response to said unique PID, extracting each PCR from each received transport packet having said unique PID,
producing a PCR clock count in response to a clock signal received at a clock input,
transferring to a second external processor one or more values on which a difference between a PCR clock count and an extracted PCR depends and for receiving from the second external processor a digitally filtered PCR clock phase error based on said difference between said PCR clock count and said extracted PCR, and
converting said digitally filtered PCR clock phase error to analog form, and feeding said analog form of said digitally filtered PCR clock phase error via at least a voltage controlled oscillator VCXO to said clock input, wherein an output of the VCXO is received at said clock input as said clock signal, so as to adjust a phase error of said PCR clock count relative to said extracted PCR.

28. The bitstream of claim 27 wherein said method further comprises the step of:
selectively programming the second external processor to digitally filter said difference between said PCR clock count and said extracted PCR to produce said phase error in a user-definable fashion.

29. The bitstream of claim 27 wherein said method further comprises the steps of:
transferring from said first processor to said second external processor a program definition of said desired program, including said unique PID, and
receiving from said second external processor, said unique PID for use in said step of extracting each PCR.

30. The bitstream of claim 27 wherein said method further comprises the step of:
in response to selected PIDs, using said processor to extract elementary stream data from only particular ones of said transport packets that contain one of said selected PIDs, and to store separately said extracted data of each elementary stream in a memory.

31. The bitstream of claim 30 wherein said method further comprises the steps of:
transferring from said first processor to a descrambler scrambled data contained in at least some of said transport packets containing selected PIDs, and
transferring descrambled data from the descrambler to said first processor.

32. The bitstream of claim 30 wherein said memory in which said first processor stores said extracted data is an external RAM, said method further comprising the steps of:
using a memory manager, managing the external RAM, storing at least some of said extracted data in the external RAM and transferring data between the external RAM and the second external processor.

33. The bitstream of claim 32 wherein said method further comprises the step of:
using said first processor and said memory manager, storing said extracted data of each stream in a separate queue maintained by said memory manager in the external RAM.

34. The bitstream of claim 33 wherein said method further comprises the step of:
using said memory manager, maintaining for each queue the start address of said queue in the external RAM, and the tail address of said queue in the external RAM.

35. The bitstream of claim 34 wherein said method further comprises the step of:

using said memory manager, maintaining the head address of at least one of said queues in the external RAM.

36. The bitstream of claim 33 wherein each of said queues has an independently selectable size.

37. The bitstream of claim 30 wherein said method further comprises the steps of:

obtaining extracted data from said memory manager for a specific elementary stream, and outputting said extracted data obtained from said memory manager to an external elementary stream decoder.

38. The bitstream of claim 37 wherein said method further comprises the steps of:

storing in an internal memory a table containing a plurality of entries, including at least one entry which indicates a particular PID and whether or not said at least one table entry is active, using said first processor, accessing said table for each transport packet, and extracting elementary stream data from only said transport packets containing a PID that matches one of said particular PIDs of each of said active table entries indicated as being active.

39. The bitstream of claim 27 wherein the VCXO is an external VCXO, said method further comprising the steps of:

using an external RC filter, low pass filtering said analog form of said digitally filtered PCR clock phase error, inputting said low pass filtered, digitally PCR clock phase error to the external VCXO, and outputting said clock signal from the external VCXO to said clock input, wherein said step of converting said digitally filtered PCR clock phase error to analog form comprises using a sigma delta digital to analog converter.

* * * * *